United States Patent
Sonoda et al.

(10) Patent No.: US 11,220,568 B2
(45) Date of Patent: Jan. 11, 2022

(54) HYDROGENATED BLOCK COPOLYMER, HYDROGENATED BLOCK COPOLYMER COMPOSITION, AND MOLDED ARTICLE

(71) Applicant: Asahi Kasei Kabushiki Kaisha, Tokyo (JP)

(72) Inventors: Yuya Sonoda, Tokyo (JP); Katsunori Nitta, Tokyo (JP); Takahiro Tsuji, Tokyo (JP)

(73) Assignee: Asahi Kasei Kabushiki Kaisha, Tokyo (JP)

(*) Notice: Subject to any disclaimer, the term of this patent is extended or adjusted under 35 U.S.C. 154(b) by 0 days.

(21) Appl. No.: 16/929,350

(22) Filed: Jul. 15, 2020

(65) Prior Publication Data

US 2021/0017318 A1   Jan. 21, 2021

(30) Foreign Application Priority Data

Jul. 16, 2019 (JP) .............................. JP2019-130981
May 27, 2020 (JP) .............................. JP2020-091970

(51) Int. Cl.
| | | |
|---|---|---|
| *C08F 293/00* | (2006.01) | |
| *C08L 53/02* | (2006.01) | |
| *C08F 297/04* | (2006.01) | |

(52) U.S. Cl.
CPC .......... *C08F 293/00* (2013.01); *C08F 297/04* (2013.01); *C08F 297/046* (2013.01); *C08L 53/02* (2013.01); *C08L 53/025* (2013.01)

(58) Field of Classification Search
CPC ...... C08L 53/025; C08L 53/02; C08F 297/04; C08F 297/044; C08F 297/046
See application file for complete search history.

(56) References Cited

U.S. PATENT DOCUMENTS

| | | | |
|---|---|---|---|
| 2004/0039128 A1 | 2/2004 | Sasagawa et al. | |
| 2011/0021704 A9 * | 1/2011 | Tse | C08L 23/10 |
| | | | 525/88 |
| 2013/0225020 A1 | 8/2013 | Flood et al. | |
| 2019/0016842 A1 | 1/2019 | Kamei et al. | |
| 2019/0136040 A1 | 5/2019 | Ichino et al. | |

FOREIGN PATENT DOCUMENTS

| | | |
|---|---|---|
| EP | 1245591 A1 | 10/2002 |
| JP | H08-169986 A | 7/1996 |
| JP | 2005-126546 A | 5/2005 |
| JP | 2007-126520 A | 5/2007 |
| KR | 10-2004-0040763 A | 5/2004 |
| TW | 201020289 A1 | 6/2010 |
| WO | 03/035705 A1 | 5/2003 |
| WO | 2010/018743 A1 | 2/2010 |
| WO | 2017/126469 A1 | 7/2017 |
| WO | 2017/188190 A1 | 11/2017 |

OTHER PUBLICATIONS

European Search Report issued in corresponding European Patent Application No. 20185302.5 dated Dec. 10, 2020.

\* cited by examiner

*Primary Examiner* — Jeffrey C Mullis
(74) *Attorney, Agent, or Firm* — Morgan, Lewis & Bockius LLP

(57) ABSTRACT

A hydrogenated block copolymer satisfying the following conditions (1) to (7):
(1) the hydrogenated block copolymer comprises (b) at least one hydrogenated copolymer block containing a vinyl aromatic monomer unit and a conjugated diene monomer unit;
(2) a content of the (a) polymer block principally containing a vinyl aromatic monomer unit is 40% by mass or less;
(3) Mw is 200,000 or less;
(4) a hydrogenation rate is 20% or more;
(5) a ratio, in a molecular weight curve of the hydrogenated block copolymer, of an area corresponding to a molecular weight of 10,000 to 150,000 to an area corresponding to a molecular weight of 10,000 to 1,000,000 is over 50%;
(6) a vinyl bond content is 20% by mass or more
(7) a content, in the (b) hydrogenated copolymer block, of the vinyl aromatic monomer unit is 30% by mass or more and 79% by mass or less.

10 Claims, No Drawings

HYDROGENATED BLOCK COPOLYMER, HYDROGENATED BLOCK COPOLYMER COMPOSITION, AND MOLDED ARTICLE

TECHNICAL FIELD

The present invention relates to a hydrogenated block copolymer, a hydrogenated block copolymer composition, and a molded article.

BACKGROUND ART

Vehicle interior materials have conventionally been required to be well balanced between wear resistance and mechanical strength. As such materials, olefin-based resins are principally used.

On the other hand, styrene-based thermoplastic elastomer materials (hereinafter sometimes simply abbreviated as "TPS materials") have been put to practical use in recent years in order to cope with cheap-looking in appearance with realizing weight reduction of vehicle components, need for environment-related issues such as recyclability and incineration easiness, heat resistance, cold resistance, heat aging resistance, light resistance, and low-odor property.

In addition, in accordance with recent demands for car sharing and self-driving cars, TPS materials that can retain wear resistance at high level and realize good texture (low hardness) and mechanical strength are demanded as the vehicle interior materials.

For meeting such demands, for example, International Publication No. WO 03/035705 proposes a composition containing a random copolymer styrene-based elastomer having a vinyl aromatic hydrocarbon content of 40% by mass or more and less than 95% by mass, and a polypropylene resin, and a molded article of this composition, and discloses that the molded article is excellent in wear resistance.

CITATION LIST

Patent Literature

[Patent Literature 1] International Publication No. WO03/035705

SUMMARY OF INVENTION

Technical Problem

The random copolymer styrene-based elastomer described in patent Literature 1 has, however, low dispersibility in a polypropylene resin, and hence has a problem that sufficient workability cannot be obtained when formed into a composition with the polypropylene resin. The random copolymer styrene-based elastomer in the form of a strand is easily broken when extruded, and hence has a problem that extrusion moldability is also not sufficient.

In recent years, in accordance with increasing demands for car sharing and self-driving cars as described above, a vehicle interior material is required of high designability, and in consideration of such designability, a molded article is desired to be formed in a complicated shape.

A molded article in a complicated shape is principally formed by injection molding, and in this case, a material of the molded article needs to have a high melt flow rate (hereinafter abbreviated as MFR). Therefore, there is a demand for a resin composition having a higher MFR with retaining required performances of wear resistance and the like.

An object of the present invention is to provide a hydrogenated block copolymer capable of providing a resin composition excellent in wear resistance and having a high MFR, a resin composition containing the hydrogenated block copolymer, and a molded article.

Solution to Problem

The present inventors made earnest studies to solve the above-described problem of the conventional technique, resulting in finding the following: A hydrogenated block copolymer having a specific structure, in which a content of a polymer block principally containing a vinyl aromatic monomer unit, a weight average molecular weight, a hydrogenation rate, an area in a GPC curve corresponding to a molecular weight in a specific range, a vinyl bond content, and a content of a vinyl aromatic monomer unit in a specific polymer block are specified, can provide a resin composition improved in wear resistance and MFR. Thus, the present invention was accomplished.

Specifically, the present invention is:

[1] A hydrogenated block copolymer that is a hydrogenated product of a block copolymer comprising a vinyl aromatic monomer unit and a conjugated diene monomer unit, satisfying the following conditions (1) to (7):

(1) the hydrogenated block copolymer comprises at least one hydrogenated copolymer block (b) containing a vinyl aromatic monomer unit and a conjugated diene monomer unit;

(2) the hydrogenated block copolymer comprises a polymer block (a) principally containing a vinyl aromatic monomer unit, and a content of the polymer block (a) containing a vinyl aromatic monomer unit is 40% by mass or less;

(3) the hydrogenated block copolymer has a weight average molecular weight (Mw) of 200,000 or less;

(4) the hydrogenated block copolymer has a hydrogenation rate of a double bond of the conjugated diene monomer unit of 20% or more;

(5) the hydrogenated block copolymer has a ratio, in a molecular weight curve of the hydrogenated block copolymer as measured by gel permeation chromatography (GPC), of an area corresponding to a molecular weight of 10,000 to 150,000 to an area corresponding to a molecular weight of 10,000 to 1,000,000 of over 50%;

(6) the hydrogenated block copolymer has a vinyl bond content of 20% by mass or more; and (7) the hydrogenated block copolymer has a content, in the (b) hydrogenated copolymer block, of the vinyl aromatic monomer unit of 30% by mass or more and 79% by mass or less.

[2] The hydrogenated block copolymer according to [1], wherein the hydrogenated block copolymer has a vinyl bond content of 30% by mass or more.

[3] The hydrogenated block copolymer according to [1] or [2], wherein
a content of the vinyl aromatic monomer unit in the hydrogenated copolymer block (b) is 45% by mass or more and 79% by mass or less.

[4] The hydrogenated block copolymer according to any one of [1] to [3], wherein
a ratio, in the molecular weight curve of the hydrogenated block copolymer as measured by gel permeation chromatography (GPC), of an area corresponding to a molecular weight of 200,000 to 1,000,000 to the area corresponding to a molecular weight of 10,000 to 1,000,000 is 10% or more.

[5] The hydrogenated block copolymer according to any one of [1] to [4], wherein a content of all vinyl aromatic monomer units is 40% by mass or more and 80% by mass or less.

[6] The hydrogenated block copolymer according to any one of [1] to [5], wherein
a content of the polymer block (a) principally containing a vinyl aromatic monomer unit is 1% by mass or more and 20% by mass or less.

[7] The hydrogenated block copolymer according to any one of [1] to [6], comprising 1% by mass or more of a hydrogenated polymer block (c) principally containing a conjugated diene monomer unit.

[8] The hydrogenated block copolymer according to any one of [1] to [7], having, in a viscoelasticity measurement chart, at least one peak of tan δ at 0° C. or more and 30° C. or less.

[9] A hydrogenated block copolymer composition, comprising:
1% by mass or more and 95% by mass or less of the hydrogenated block copolymer (I) according to any one of [1] to [8]; and
5% by mass or more and 99% by mass or less of at least one olefin-based resin (II).

[10] The hydrogenated block copolymer composition according to [9], wherein
the olefin-based resin (II) contains at least one polypropylene-based resin.

[11] A molded article of the hydrogenated block copolymer composition according to [9] or [10] described above.

Advantageous Effects of Invention

According to the present invention, a hydrogenated block copolymer capable of providing excellent wear resistance and a high MFR when formed into a resin composition with polyolefin can be obtained.

DESCRIPTION OF EMBODIMENTS

Now, an embodiment for practicing the present invention (hereinafter referred to as the "present embodiment") will be described in detail. It is noted that the present embodiment described below is merely illustrative for describing the present invention and is not intended to limit the present invention, and that the present invention can be variously modified and changed within the scope thereof.

[Hydrogenated Block Copolymer]

A hydrogenated block copolymer of the present embodiment (hereinafter sometimes referred to as the hydrogenated block copolymer (I)) is a hydrogenated product of a block copolymer containing a vinyl aromatic monomer unit and a conjugated diene monomer unit, and satisfies the following conditions (1) to (7):

(1) The hydrogenated block copolymer (I) contains (b) at least one hydrogenated copolymer block containing a vinyl aromatic monomer unit and a conjugated diene monomer unit (hereinafter sometimes referred to as the copolymer block (b));

(2) the hydrogenated block copolymer (I) contains (a) a polymer block principally containing a vinyl aromatic monomer unit (hereinafter sometimes referred to as the polymer block (a)), and a content of the polymer block (a) is 40% by mass or less;

(3) the hydrogenated block copolymer (I) has a weight average molecular weight (Mw) of 200,000 or less;

(4) the hydrogenated block copolymer (I) has a hydrogenation rate of a double bond of the conjugated diene monomer unit of 20% or more;

(5) the hydrogenated block copolymer (I) has a ratio, in a molecular weight curve of the hydrogenated block copolymer as measured by gel permeation chromatography (GPC), of an area corresponding to a molecular weight of 10,000 to 150,000 to an area corresponding to a molecular weight of 10,000 to 1,000,000 of over 50%;

(6) the hydrogenated block copolymer (I) has a vinyl bond content of 20% by mass or more; and (7) the hydrogenated block copolymer (I) has a content, in the (b) hydrogenated copolymer block, of the vinyl aromatic monomer unit of 30% by mass or more and 79% by mass or less.

(Vinyl Aromatic Monomer Unit)

The hydrogenated block copolymer (I) of the present embodiment contains the vinyl aromatic monomer unit.

Examples of the vinyl aromatic monomer unit include, but are not limited to, monomer units derived from styrene, α-methylstyrene, p-methylstyrene, divinyl benzene, 1,1-diphenyl ethylene, N,N-dimethyl-p-aminoethylstyrene, N,N-diethyl-p-aminoethylstyrene and the like.

In particular, from the viewpoint of balance between cost and mechanical strength, styrene is preferred.

One of these monomer units may be singly used, or two or more of these may be used together.

(Conjugated Diene Monomer Unit)

The hydrogenated block copolymer (I) of the present embodiment contains the conjugated diene monomer unit.

The conjugated diene monomer unit refers to a monomer unit derived from a diolefin having a pair of conjugated double bonds. Examples of such a diolefin include, but are not limited to, 1,3-butadiene, 2-methyl-1,3-butadiene (isoprene), 2,3-dimethyl-1,3-butadiene, 1,3-pentadiene, 2-methyl-1,3-pentadiene, and 1,3-hexadiene.

In particular, from the viewpoint of balance between good moldability and mechanical strength, 1,3-butadiene and isoprene are preferred.

One of these may be singly used, or two or more of these may be used together.

In the hydrogenated block copolymer (I) of the present embodiment, a vinyl bond content in the conjugated diene monomer unit is 20% by mass or more, more preferably 25% by mass or more, further preferably 30% by mass or more, and still more preferably 35% by mass or more.

When the vinyl bond content in the conjugated diene monomer unit of the hydrogenated block copolymer (I) is 20% by mass or more, in a hydrogenated block copolymer composition of the present embodiment obtained through combination of the hydrogenated block copolymer (I) and an olefin-based resin (II) described later, hardness and extrusion moldability tend to be improved, and when it is 30% by mass or more, particularly the MFR and the wear resistance tend to be good. As the vinyl bond content is increased, these physical properties are improved.

The vinyl bond content of the hydrogenated block copolymer (I) can be controlled, for example, by using a modifier described later, such as a tertiary amine compound or an ether compound.

In the hydrogenated block copolymer (I) of the present embodiment, a content of all vinyl aromatic monomer units is preferably 40% by mass or more and 80% by mass or less, more preferably 45% by mass or more and 80% by mass or less, further preferably 47% by mass or more and 78% by mass or less, and still more preferably 50% by mass or more and 75% by mass or less.

When the content of all vinyl aromatic monomer units falls in the above-described range, balance among the hardness, the extrusion moldability and the wear resistance tends to be good.

In the present embodiment, the content of all vinyl aromatic monomer units in the hydrogenated block copolymer (I) can be measured with a UV spectrophotometer using, as a sample, a block copolymer obtained before hydrogenation or the hydrogenated block copolymer obtained after hydrogenation.

The content of all vinyl aromatic monomer units in the hydrogenated block copolymer (I) can be controlled to fall in the above-described numerical range by principally adjusting the amount of a vinyl aromatic compound to be added to a reactor, a reaction temperature and a reaction time.

Herein, regarding the structure of the hydrogenated block copolymer, the term "principally contain" means that a ratio in a prescribed block polymer or polymer block is 85% by mass or more, preferably 90% by mass or more, and more preferably 95% by mass or more.

It is noted that the content of the vinyl aromatic monomer unit in the hydrogenated copolymer block (b) is 30% by mass or more and 79% by mass or less, and hence the polymer block (a) and the hydrogenated copolymer block (b) can be definitely distinguished from each other.

(Polymer Block (a) Principally Containing Vinyl Aromatic Monomer Unit)

The hydrogenated block copolymer (I) of the present embodiment contains, from the viewpoint of preventing pellet blocking, at least one polymer block (a) principally containing a vinyl aromatic monomer unit.

In the hydrogenated block copolymer (I) of the present embodiment, a content of the (a) polymer block is 40% by mass or less, preferably 1% by mass or more and 40% by mass or less, more preferably 1% by mass or more and 20% by mass or less, and further preferably 5% by mass or more and 15% by mass or less.

When the content of the (a) polymer block in the hydrogenated block copolymer (I) of the present embodiment is 40% by mass or less, the hydrogenated block copolymer composition of the present embodiment described later becomes well-balanced between the wear resistance and the hardness.

The content of the polymer block (a) can be measured by a method using a nuclear magnetic resonance apparatus (NMR) (a method described in Y. Tanaka, et al., RUBBER CHEMISTRY and TECHNOLOGY 54, 685 (1981); hereinafter referred to as the "NMR" method) using, as a sample, the block copolymer obtained before hydrogenation or the hydrogenated block copolymer obtained after hydrogenation.

The content of the polymer block (a) in the hydrogenated block copolymer (I) can be controlled to fall in the above-described numerical range by principally adjusting the amount of a vinyl aromatic compound to be added to a reactor, a reaction temperature and a reaction time.

(Hydrogenated Copolymer Block (b))

The hydrogenated block copolymer (I) of the present embodiment contains the hydrogenated copolymer block (b) containing a vinyl aromatic monomer unit and a conjugated diene monomer unit.

A content of the vinyl aromatic monomer unit in the hydrogenated copolymer block (b) is 30% by mass or more and 79% by mass or less, preferably 40% by mass or more and 79% by mass or less, more preferably 45% by mass or more and 79% by mass or less, and further preferably 45% by mass or more and 70% by mass or less.

When the content of the vinyl aromatic monomer unit in the hydrogenated copolymer block (b) is 30% by mass or more and 79% by mass or less, the hydrogenated block copolymer composition of the present embodiment described later exhibits good wear resistance. When the content is 45% by mass or more and 79% by mass or less, the hydrogenated block copolymer composition exhibits higher wear resistance, and can be applied to use more strict in wear resistance requirement.

When the content of the vinyl aromatic monomer unit in the hydrogenated copolymer block (b) is 79% by mass or less, the extrusion moldability of the hydrogenated block copolymer composition of the present embodiment described later tends to be improved, and the hardness thereof tends to be lowered.

It is noted that the content of the vinyl aromatic monomer unit in the hydrogenated copolymer block (b) in the hydrogenated block copolymer (I) of the present embodiment can be measured using a nuclear magnetic resonance apparatus (NMR) or the like.

The content of the vinyl aromatic monomer unit in the hydrogenated copolymer block (b) can be controlled to fall in the above-described numerical range by principally adjusting the amounts of a vinyl aromatic compound and a conjugated diene to be added to a reactor, and a reaction temperature.

A vinyl bond content in a conjugated diene portion of the copolymer block obtained before hydrogenation of the hydrogenated polymer block (b) can be controlled, for example, using a modifier described later, such as a tertiary amine compound or an ether compound.

When 1,3-butadiene is used as the conjugated diene, from the viewpoint of obtaining good balance among the wear resistance, the MFR and the hardness in the hydrogenated block copolymer composition of the present embodiment described later, a 1,2-vinyl bond content of the conjugated diene portion in the copolymer block obtained before hydrogenation of the hydrogenated copolymer block (b) is preferably 25% by mass or more and 95% by mass or less, and more preferably 30% by mass or more and 90% by mass or less.

When isoprene is used as the conjugated diene, or when 1,3-butadiene and isoprene are used together, a total content of a 1,2-vinyl bond and 3,4-vinyl bond is preferably 3% by mass or more and 75% by mass or less, and more preferably 5% by mass or more and 60% by mass or less.

It is noted that the total content of 1,2-vinyl bond and 3,4-vinyl bond (a 1,2-vinyl bond content when 1,3-butadiene is used as the conjugated diene, however) is designated as the vinyl bond content in the present embodiment.

The vinyl bond content can be measured through measurement using an infrared spectrophotometer using a copolymer obtained before hydrogenation as a sample (for example, by a Hampton method).

(Hydrogenated Polymer Block (c) Principally Containing Conjugated Diene Monomer Unit)

The hydrogenated block copolymer (I) of the present embodiment preferably contains a hydrogenated polymer block (c) principally containing a conjugated diene monomer unit.

In the hydrogenated block copolymer (I) of the present embodiment, a content of the hydrogenated polymer block (c) is preferably 1% by mass or more, more preferably 2% by mass or more and 20% by mass or less, further preferably 2% by mass or more and 15% by mass or less, and still more preferably 2% by mass or more and 8% by mass or less from the viewpoint of the MFR and the hardness of the hydrogenated block copolymer (I) and the balance among the MFR, the wear resistance and the hardness of the hydrogenated block copolymer composition of the present embodiment described later.

The content of the hydrogenated polymer block (c) in the hydrogenated block copolymer (I) can be controlled to fall in the above-described numerical range by principally controlling the amount of a conjugated diene to be added to a reactor, and a reaction temperature.

A vinyl bond of the conjugated diene monomer unit after hydrogenation in the hydrogenated polymer block (c) has a chemical structure similar to the olefin-based resin (II) described later. Therefore, a vinyl bond content of the conjugated diene monomer unit before hydrogenation in the hydrogenated polymer block (c) affects compatibility between the hydrogenated block copolymer (I) and the olefin-based resin (II), and from the viewpoint of improving the compatibility to obtain good wear resistance, MFR and hardness of the hydrogenated block copolymer composition of the present embodiment described later, the vinyl bond content is preferably 50% by mass or more, more preferably 55% by mass or more, and further preferably 60% by mass or more.

(tan δ (Loss Tangent) in Viscoelasticity Measurement Chart of Hydrogenated Block Copolymer (I))

The hydrogenated block copolymer (I) of the present embodiment preferably has, in a viscoelasticity measurement chart, at least one peak of tan δ (loss tangent) at −25° C. or more and 40° C. or less. At least one peak is present more preferably at −15° C. or more and 35° C. or less, further preferably at −10° C. or more and 30° C. or less, and still more preferably at 0° C. or more and 30° C. or less.

This peak of tan δ is a peak derived from the hydrogenated copolymer block (b) in the hydrogenated block copolymer (I). The presence of at least one peak in a range of −25° C. or more and 40° C. or less is significant for the hardness of the hydrogenated block copolymer and for retaining wear resistance and good texture of the hydrogenated block copolymer composition of the present embodiment described later.

As described above, the hydrogenated copolymer block (b) is obtained by hydrogenating a copolymer block containing a conjugated diene monomer unit and a vinyl aromatic monomer unit.

In order that at least one peak of tan δ (loss tangent) is present in the range of −25° C. or more and 40° C. or less, it is effective to control a ratio (mass ratio) of the conjugated diene monomer unit/the vinyl aromatic monomer unit, and the ratio (mass ratio) of the conjugated diene monomer unit/the vinyl aromatic monomer unit is preferably 75/25 to 16/84, more preferably 70/30 to 18/82, and further preferably 60/40 to 25/75.

In order that at least one peak of tan δ (loss tangent) is present in the range of 0° C. or more and 30° C. or less, it is effective to control a ratio (mass ratio) of the conjugated diene monomer unit/the vinyl aromatic monomer unit, and the ratio (mass ratio) of the conjugated diene monomer unit/the vinyl aromatic monomer unit is preferably 65/35 to 16/84, more preferably 60/40 to 25/75, and further preferably 55/45 to 30/70.

It is noted that the tan δ can be measured using a viscoelasticity measuring device (ARES, manufactured by TA Instruments) under conditions of a strain of 0.5%, a frequency of 1 Hz and a temperature increasing rate of 3° C./min. Specifically, a method described in an example later will be employed for the measurement.

(Weight Average Molecular Weight of Hydrogenated Block Copolymer (I))

A weight average molecular weight (Mw) of the hydrogenated block copolymer (I) of the present embodiment is 200,000 or less, and from the viewpoint of obtaining good balance among the wear resistance, the MFR, the hardness and the pellet blocking property in the hydrogenated block copolymer composition of the present embodiment described later, is preferably 50,000 or more and 190,000 or less, more preferably 60,000 or more and 180,000 or less, and further preferably 70,000 or more and 170,000 or less.

It is noted that the weight average molecular weight of the hydrogenated block copolymer (I) can be obtained in the present embodiment by performing gel permeation chromatography (GPC) measurement using a calibration curve obtained through measurement of commercially available standard polystyrene (created by using a peak molecular weight of standard polystyrene).

(Distribution in Molecular Weight Curve of Hydrogenated Block Copolymer (I))

In a GPC curve of the hydrogenated block copolymer (I) of the present embodiment, a ratio (%) of an area corresponding to a molecular weight of 10,000 to 150,000 to an area corresponding to a molecular weight of 10,000 to 1,000,000 is over 50%.

From the viewpoint of obtaining good balance among the wear resistance, the MFR, the hardness and the pellet blocking property, the ratio is over 50%, preferably 60% to 99%, and more preferably 70% to 95%.

As the ratio of the area corresponding to the molecular weight of 10,000 to 150,000 is higher, the MFR is improved and the hardness is lowered, and as the ratio is lower, the wear resistance is improved and the pellet blocking property is lowered.

It is noted that the ratio of the area corresponding to the molecular weight of 10,000 to 150,000 in the GPC curve of the hydrogenated block copolymer (I) of the present embodiment can be controlled to fall in the above-described numerical range by controlling the amounts of a polymerization initiator and a coupling agent or by mixing two or more polymers having suitable molecular weight distributions.

A ratio (%) of an area corresponding to a molecular weight of 200,000 to 1,000,000 to the area corresponding to the molecular weight of 10,000 to 1,000,000 in the GPC curve of the hydrogenated block copolymer (I) of the present embodiment is preferably 10% or more, and more preferably 20% or more from the viewpoint of obtaining balance between the wear resistance and the pellet blocking property.

As the ratio of the area corresponding to the molecular weight of 200,000 to 1,000,000 is higher, the wear resistance is improved and the pellet blocking property is lowered.

In particular, in order to improve the wear resistance and the pellet blocking property, it is preferable that the ratio of the area corresponding to the molecular weight of 200,000 or more of the hydrogenated block copolymer (I) is within the above-described numerical range, and it is more preferable that a ratio of an area corresponding to a molecular weight of 220,000 or more is within the above-described numerical range, and it is further preferable that a ratio of an area corresponding to a molecular weight of 240,000 or more is within the above-described numerical range.

In order to improve the MFR, it is preferable that a ratio of an area corresponding to a molecular weight of 1,000,000 or less of the hydrogenated block copolymer (I) is within the above-described numerical range, it is more preferable that a ratio of an area corresponding to a molecular weight of 700,000 or less is within the above-described numerical range, it is further preferable that a ratio of an area corresponding to a molecular weight of 500,000 or less is within the above-described numerical range, and it is still more preferable that a ratio of an area corresponding to a molecular weight of 300,000 or less is within the above described numerical range.

It is noted that the ratio of the area corresponding to a molecular weight of 200,000 to 1,000,000 in the GPC curve of the hydrogenated block copolymer (I) of the present embodiment can be controlled to fall in the above-described numerical range by adjusting the amounts of a polymerization initiator and a coupling agent, or by mixing two or more polymers having suitable molecular weight distributions.

(Hydrogenation Rate of Double Bond of Conjugated Diene Monomer Unit in Hydrogenated Block Copolymer (I))

A hydrogenation rate of a double bond of the conjugated diene monomer unit in the hydrogenated block copolymer (I) of the present embodiment is 20% or more, preferably 50% or more, more preferably 85% or more, and further preferably 92% or more from the viewpoint of obtaining good hardness and MFR in the hydrogenated block copolymer composition of the present embodiment described later.

The hydrogenation rate of the double bond of the conjugated diene monomer unit in the hydrogenated block copolymer (I) can be controlled to fall in the above-described numerical range by adjusting a hydrogenation amount.

(Hydrogenation Rate of Aromatic Double Bond of Vinyl Aromatic Monomer Unit in Hydrogenated Block Copolymer (I))

A hydrogenation rate of an aromatic double bond of the vinyl aromatic monomer unit in the hydrogenated block copolymer (I) of the present embodiment is not especially limited, and is preferably 50% or less, more preferably 30% or less, and further preferably 20% or less.

Here, the hydrogenation rate of the hydrogenated block copolymer (I) can be measured using a nuclear magnetic resonance apparatus (NMR) or the like.

(Crystallization Peak of Hydrogenated Block Copolymer (I))

The hydrogenated block copolymer (I) of the present embodiment is preferably a hydrogenated product that does not substantially have a crystallization peak derived from the hydrogenated copolymer block (b) in a range of −25° C. to 80° C. in a differential scanning calorimetry (DSC) chart.

Here, the term "does not substantially have a crystallization peak derived from the hydrogenated copolymer block (b) in a range of −25° C. to 80° C." means the following. In this temperature range, a peak derived from crystallization of a portion of the hydrogenated polymer block (b) does not appear, or even when a peak derived from the crystallization is observed, a crystallization peak calorific value resulting from the crystallization is less than 3 J/g, preferably less than 2 J/g, more preferably less than 1 J/g, and still more preferably none.

When the hydrogenated block copolymer (I) of the present embodiment does not substantially have a crystallization peak derived from the hydrogenated copolymer block (b) in the range of −25° C. to 80° C. as described above, good flexibility can be obtained, and the hydrogenated block copolymer composition of the present embodiment described later can be suitably softened.

In order to obtain the hydrogenated block copolymer (I) that does not substantially have a crystallization peak derived from the hydrogenated copolymer block (b) in the range of −25° C. to 80° C., a copolymer obtained by a polymerization reaction performed under conditions described later using a prescribed modifier for adjusting the vinyl bond content and adjusting copolymerizability between the vinyl aromatic compound and the conjugated diene may be subjected to a hydrogenation reaction.

(Structure of Hydrogenated Block Copolymer (I))

The structure of the hydrogenated block copolymer (I) of the present embodiment is not especially limited, and examples include structures represented by the following general formulas:

$(b-c)_n$, $c-(b-c)_n$, $b-(c-b)_n$, $(b-c)_m$-X, $(c-b)_m$-X, $c-(b-a)_n$, $c-(a-b)_n$, $c-(a-b-a)_n$, $c-(b-a-b)_n$, $c-(b-c-a)_n$, $a-(c-b-c-a)_n$, $a-c-(b-a)_n$, $a-c-(a-b)_n$, $a-c-(b-a)_n-b$, $[(a-b-c)_n]_m$-X, $[a-(b-c)_n]_m$-X, $[(a-b)_n-c]_m$-X, $[(a-b-a)_n-c]_m$-X, $[(b-a-b)_n-c]_m$-X, $[(c-b-a)_n]_m$-X, $[c-(b-a)_n]_m$-X, $[c-(a-b-a)_n]_m$-X, and $[c-(b-a-b)_n]_m$-X.

In these general formulas, a represents the polymer block (a) principally containing a vinyl aromatic monomer unit, b represents the hydrogenated copolymer block (b) containing a vinyl aromatic monomer unit and a conjugated diene monomer unit, and c represents the hydrogenated polymer block (c) principally containing a conjugated diene monomer unit.

Also in these general formulas, n represents an integer of 1 or more, and is preferably an integer of 1 to 5; m represents an integer of 2 or more, and is preferably an integer of 2 to 11; and X represents a residue of a coupling agent or a residue of a multifunctional initiator.

(Other Examples of Structure of Hydrogenated Block Copolymer (I))

The hydrogenated block copolymer (I) of the present embodiment may be a modified block copolymer in which atomic groups each having a prescribed functional group are bonded to one another.

The modified block copolymer may be a secondary modified block copolymer.

[Production Method for Hydrogenated Block Copolymer (I)]

A block copolymer corresponding to a state obtained before the hydrogenation of the hydrogenated block copolymer (I) of the present embodiment is obtained, for example, by living anionic polymerization of a vinyl aromatic compound and a conjugated diene compound performed in a hydrocarbon solvent by using a polymerization initiator such as an organic alkali metal compound.

(Solvent)

Examples of the hydrocarbon solvent include, but are not limited to, aliphatic hydrocarbons such as n-butane, isobutane, n-pentane, n-hexane, n-heptane and n-octane; alicyclic hydrocarbons such as cyclohexane, cycloheptane and methylcycloheptane; and aromatic hydrocarbons such as benzene, toluene, xylene and ethylbenzene.

(Polymerization Initiator)

The polymerization initiator is not especially limited, and for example, organic alkali metal compounds such as an aliphatic hydrocarbon alkali metal compound, an aromatic hydrocarbon alkali metal compound and an organic amino alkali metal compound, which are known to have anionic polymerization activity on a vinyl aromatic compound and a conjugated diene, can be generally applied.

Preferable examples of the organic alkali metal compounds include, but are not limited to, aliphatic and aromatic hydrocarbon lithium compounds having 1 to 20 carbon atoms, and a compound containing one lithium in one molecule, and a dilithium compound, a trilithium compound and a tetralithium compound each containing a plurality of lithiums in one molecule can be applied.

Specific examples include n-propyllithium, n-butyllithium, sec-butyllithium, tert-butyllithium, n-pentyllithium, n-hexyllithium, benzyllithium, phenyllithium, trityllithium, a reaction product of diisopropylbenzene and sec-butyllithium, and a reaction product of divinylbenzene, sec-butyllithium and a small amount of 1,3-butadiene.

In addition, organic alkali metal compounds disclosed in, for example, U.S. Pat. No. 5,708,092, British Patent No. 2,241,239, and U.S. Pat. No. 5,527,753 can be applied.

(Modifier)

For example, when a vinyl aromatic compound and a conjugated diene are copolymerized by using an organic alkali metal compound as a polymerization initiator, a content of vinyl bonds (such as 1,2-bond or 3,4-bond) derived from the conjugated diene incorporated into a resultant polymer, and random copolymerizability between the vinyl aromatic compound and the conjugated diene can be adjusted by using a prescribed modifier.

Examples of such a modifier include, but are not limited to, a tertiary amine compound, an ether compound, and a metal alcoholate compound.

One of these modifiers may be singly used, or two or more of these may be used in combination.

An example of the tertiary amine compound includes, but is not limited to, a compound represented by a general formula R1R2R3N (wherein R1, R2 and R3 represent a hydrocarbon group having 1 to 20 carbon atoms, or a hydrocarbon group having a tertiary amino group).

Specific examples include trimethylamine, triethylamine, tributylamine, N,N-dimethylaniline, N-ethylpiperidine, N-methylpyrrolidine, N,N,N',N'-tetramethylethylenediamine, N,N,N',N'-tetraethylethylenediamine, 1,2-dipiperidinoethane, trimethylaminoethylpiperazine, N,N,N',N'',N''-pentamethylethylenetriamine, and N,N'-dioctyl-p-phenylenediamine.

Examples of the ether compound include, but are not limited to, a linear ether compound and a cyclic ether compound.

Examples of the linear ether compound include, but are not limited to, dialkyl ether compounds of ethylene glycol, such as dimethyl ether, diethyl ether, diphenyl ether, ethylene glycol dimethyl ether, ethylene glycol diethyl ether, and ethylene glycol dibutyl ether; and dialkyl ether compounds of diethylene glycol, such as diethylene glycol dimethyl ether, diethylene glycol diethyl ether, and diethylene glycol dibutyl ether.

Examples of the cyclic ether compound include, but are not limited to, alkyl ethers such as tetrahydrofuran, dioxane, 2,5-dimethyloxolane, 2,2,5,5-tetramethyloxolane, 2,2-bis(2-oxolanyl)propane, and furfuryl alcohol.

Examples of the metal alcoholate compound include, but are not limited to, sodium-t-pentoxide, sodium-t-butoxide, potassium-t-pentoxide, and potassium-t-butoxide.

(Polymerization Method)

As a method for polymerizing a vinyl aromatic compound and a conjugated diene polymer by using, for example, an organic alkali metal compound as a polymerization initiator, a conventionally known method can be applied.

For example, the polymerization method may be, but is not limited to, any one of batch polymerization, continuous polymerization and a combination of these methods. In particular, for obtaining a copolymer excellent in heat resistance, batch polymerization is suitably employed.

A polymerization temperature is preferably 0° C. to 180° C., and more preferably 30° C. to 150° C. A polymerization time is varied depending on conditions, and is usually 48 hours or less, and preferably 0.1 to 10 hours.

As an atmosphere of a polymerization system, an inert gas atmosphere such as nitrogen gas is preferred.

A polymerization pressure is not especially limited as long as it is set within a pressure range where monomers and a solvent can be retained in a liquid phase in the above-described temperature range.

Attention is preferably paid so that an impurity inactivating a catalyst and a living polymer, such as water, oxygen and carbon dioxide, cannot enter the polymerization system.

In completing the polymerization process, a coupling reaction may be performed with a necessary amount of a bi- or higher functional coupling agent added thereto.

A bifunctional coupling agent is not especially limited, and any of known agents can be used. Examples include alkoxysilane compounds such as trimethoxysilane, triethoxysilane, tetramethoxysilane, tetraethoxysilane, dimethyldimethoxysilane, diethyldimethoxysilane, dichlorodimethoxysilane, dichlorodiethoxysilane, trichloromethoxysilane and trichloroethoxysilane; dihalogen compounds such as dichloroethane, dibromoethane, dimethyldichlorosilane and dimethyldibromosilane; and acid esters such as methyl benzoate, ethyl benzoate, phenyl benzoate, and phthalic esters.

A tri- or higher functional coupling agent is not especially limited, and any of known agents can be used. Examples include tri- or higher valent polyalcohols, polyvalent epoxy compounds such as epoxidized soybean oil, diglycidyl bisphenol A, and 1,3-bis(N-N'-diglycidylaminomethyl)cyclohexane; and polyvalent halogen compounds such as a silicon halide compound represented by a general formula $R_4\text{-nSiX}_n$, (wherein R represents a hydrocarbon group having 1 to 20 carbon atoms, X represents a halogen, and n represents an integer of 3 to 4), such as methyl silyl trichloride, t-butyl silyl trichloride, silicon tetrachloride, and a bromide of any of these, and a tin halide compound represented by a general formula $R_4\text{-nSnX}_n$, (wherein R represents a hydrocarbon group having 1 to 20 carbon atoms, X represents a halogen, and n represents an integer of 3 to 4), such as methyl tin trichloride, t-butyl tin trichloride, and tin tetrachloride. Alternatively, dimethyl carbonate, diethyl carbonate or the like may be used.

(Modification Process)

As described above, the hydrogenated block copolymer (I) of the present embodiment may be a modified block copolymer in which atomic groups each having a functional group are bonded to one another. The atomic groups having a functional group are bonded preferably in process preceding hydrogenation process described later.

The "atomic group having a functional group" is not especially limited, and an example includes an atomic group having at least one functional group selected from the group consisting of a hydroxyl group, a carboxyl group, a carbonyl group, a thiocarbonyl group, an acid halide group, an acid anhydride group, a carboxylic acid group, a thiocarboxylic acid group, an aldehyde group, a thioaldehyde group, a carboxylic ester group, an amide group, a sulfonic acid group, a sulfonic ester group, a phosphoric acid group, a phosphoric ester group, an amino group, an imino group, a nitrile group, a pyridyl group, a quinoline group, an epoxy group, a thioepoxy group, a sulfide group, an isocyanate group, an isothiocyanate group, a silicon halide group, a silanol group, an alkoxysilicone group, a tin halide group, a boronic acid group, a boron-containing group, a boronate group, an alkoxytin group, and a phenyltin group. In particular, an atomic group having at least one functional group selected from the group consisting of a hydroxyl group, an epoxy group, an amino group, a silanol group, and an alkoxysilane group is preferred.

The "atomic group having a functional group" is bonded with a denaturant.

The denaturant is not especially limited, and examples include tetraglycidyl methaxylene diamine, tetraglycidyl-1,3-bisaminomethylcyclohexane, ε-caprolactone, δ-valerolactone, 4-methoxybenzophenone, γ-glycidoxyethyltrimethoxysilane, γ-glycidoxypropyltrimethoxysilane, γ-glycidoxypropyldimethylphenoxysilane, bis(γ-glycidoxypropyl)methylpropoxysilane, 1,3-dimethyl-2-imidazolidine, 1,3-diethyl-2-imidazolidinone, N,N'-dimethylpropyleneurea, and N-methylpyrrolidone.

Although not especially limited, the modified block copolymer can be obtained, for example, by anionic living polymerization for performing polymerization using a polymerization initiator having a functional group or an unsaturated monomer having a functional group, for forming a functional group at a living end, or for performing an addition reaction with a denaturant having a functional group.

As another method for obtaining the modified block copolymer, a block copolymer is reacted (metalation reaction) with an organic alkali metal compound such as an organic lithium compound, and the thus obtained block polymer to which the organic alkali metal has been added is addition reacted with a denaturant having a functional group.

In employing the latter method, however, the metalation reaction can be performed after obtaining the hydrogenated block copolymer (I) and then the resultant can be reacted with a denaturant to produce a modified hydrogenated block copolymer.

A temperature for performing a modification reaction is preferably 0° C. to 150° C., and more preferably 20° C. to 120° C. A time necessary for the modification reaction is varied depending on the other conditions, and is preferably 24 hours or less, and more preferably 0.1 to 10 hours.

Depending on the type of a denaturant used, an amino group or the like has been sometimes generally changed into an organic metal salt when the denaturant is reacted, and in such a case, the organic metal salt can be converted into an amino group or the like through a treatment with water or a compound having active hydrogen such as alcohol. It is noted that such a modified copolymer may partially contain a non-modified copolymer.

The modified block copolymer may be a secondary modified block copolymer. A secondary modified block copolymer can be obtained by reacting a modified block copolymer with a secondary denaturant reactive with a functional group of the modified block copolymer.

The secondary denaturant is not especially limited, and an example includes a denaturant having a functional group selected from the group consisting of a carboxyl group, an acid anhydride group, an isocyanate group, an epoxy group, a silanol group, and an alkoxysilane group, and the secondary denaturant has at least two functional groups selected from these functional groups.

When the functional group is an acid anhydride group, however, the secondary denaturant may have merely one acid anhydride group.

When the modified block copolymer is reacted with the secondary denaturant as described above, the amount of the secondary denaturant used per equivalent of a functional group bonded to the modified block copolymer is preferably 0.3 moles to 10 moles, more preferably 0.4 moles to 5 moles, and further preferably 0.5 moles to 4 moles.

A method for reacting the modified block copolymer with the secondary denaturant is not especially limited, and any of known methods can be applied. Examples of the method include a melt kneading method described later, and a method in which respective components are dissolved or dispersed in a solvent or the like to be mixed for the reaction. It is noted that such secondary modification is performed preferably after the hydrogenation process.

As the secondary denaturant, specifically, maleic anhydride, pyromellitic anhydride, 1,2,4,5-benzenetetracarboxylic dianhydride, toluylene diisocyanate, tetraglycidyl-1,3-bisaminomethylcyclohexane, bis-(3-triethoxysilylpropyl)-tetrasulfane or the like are suitably used.

The hydrogenated block copolymer (I) of the present embodiment can be a modified block copolymer graft modified with α,β-unsaturated carboxylic acid or a derivative thereof, such as an anhydride, an esterified product, an amidated product, or an imidated product thereof.

The α,β-unsaturated carboxylic acid or a derivative thereof is not especially limited, and specific examples include maleic anhydride, maleic anhydride imide, acrylic acid or an ester thereof, methacrylic acid or an ester thereof, and endo-cis-bicyclo[2,2,1]-5-heptene-2,3-dicarboxylic acid or an anhydride thereof.

The amount of the α,β-unsaturated carboxylic acid or a derivative thereof to be added is, with respect to 100 parts by mass of the hydrogenated block copolymer (I), preferably 0.01 to 20 parts by mass, and more preferably 0.1 to 10 parts by mass.

A reaction temperature in the graft modification is preferably 100° C. to 300° C., and more preferably 120° C. to 280° C.

A specific method for the graft modification is not especially limited, and for example, a method described in Japanese Patent Laid-Open No. 62-79211 can be applied.

(Hydrogenation Reaction Process)

The hydrogenation block copolymer (I) of the present embodiment can be obtained by subjecting the above-described non-hydrogenated non-modified or modified block copolymer to a hydrogenation reaction using a prescribed hydrogenation catalyst.

The hydrogenation catalyst is not especially limited, and examples include known catalysts of (1) a supported heterogenous hydrogenation catalyst in which a metal such as Ni, Pt, Pd, or Ru is supported on carbon, silica, alumina, diatomaceous earth or the like, (2) what is called a Ziegler hydrogenation catalyst using an organic acid salt of Ni, Co, Fe, Cr or the like or a transition metal salt such as an acetylacetone salt, and a reducing agent such as organic aluminum, and (3) a homogenous hydrogenation catalyst such as what is called an organic metal complex of an organic metal compound or the like of Ti, Ru, Rh, Zr or the like.

Specific examples include, but are not limited to, hydrogenation catalysts described in Japanese Patent Publication Nos. 42-8704, 43-6636, 63-4841, 1-37970, 1-53851 and 2-9041.

Suitable examples of the hydrogenation catalyst include a titanocene compound, a reducing organometallic compound, and a mixture of these.

The titanocene compound is not especially limited, and for example, a compound described in Japanese Patent Laid-Open Publication No. 8-109219 can be used. A specific example includes a compound having at least one ligand having a (substituted) cyclopentadienyl skeleton, an indenyl skeleton or a fluorenyl skeleton, such as bis-cyclopentadienyl titanium dichloride or mono-pentamethylcyclopentadienyl titanium trichloride.

Examples of the reducing organometallic compound include, but are not limited to, an organic alkali metal compound such as organic lithium, an organic magnesium compound, an organic aluminum compound, an organic boron compound, and an organic zinc compound.

The hydrogenation reaction will now be described. A reaction temperature is generally preferably a temperature range of 0° C. to 200° C., and more preferably a temperature range of 30° C. to 150° C.

A pressure of hydrogen used in the hydrogenation reaction is preferably 0.1 MPa to 15 MPa, more preferably 0.2 MPa to 10 MPa, and further preferably 0.3 MPa to 5 MPa.

A hydrogenation reaction time is usually preferably 3 minutes to 10 hours, and more preferably 10 minutes to 5 hours.

The hydrogenation reaction may be performed by any of batch process, continuous process, and a combination of these.

It is preferable that a catalyst residue is removed, if necessary, from a solution of a hydrogenated block copolymer resulting from the hydrogenation reaction, and that the hydrogenated block copolymer is separated from the solution.

Examples of a separation method include, but are not limited to, a method in which a polar solvent working as a poor solvent for a hydrogenated modified copolymer, such as acetone or alcohol, is added to a reaction solution after the hydrogenation to precipitate and collect the polymer; a method in which the reaction solution is put in hot water under stirring, and the solvent is removed by steam stripping to collect the polymer; and a method in which the polymer solution is directly heated to remove the solvent.

It is noted that a stabilizer, such as various phenol-based stabilizers, phosphorus-based stabilizers, sulfur-based stabilizers and amine-based stabilizer, may be added to the hydrogenated block copolymer (I) of the present embodiment.

[Hydrogenated Block Copolymer Composition]

The hydrogenated block copolymer composition of the present embodiment contains 1% by mass or more and 95% by mass or less of the (I) hydrogenated block copolymer described above, and 5% by mass or more and 99% by mass or less of (II) at least one olefin-based resin.

((II) Olefin-Based Resin)

The olefin-based resin (II) contained in the hydrogenated block copolymer composition of the present embodiment will now be described.

Examples of the olefin-based resin (II) include, but are not limited to, homopolymers of α-olefins such as polyethylene (PE), polypropylene (PP), 1-butene, 1-pentene, 1-hexene, 3-methyl-1-butene, 4-methyl-1-pentene, and 1-octene. Other examples include a random copolymer or a block copolymer containing a combination of olefins selected from the group consisting of ethylene, propylene, butene, pentene, hexene and octene.

Specific examples include ethylene and/or propylene-α-olefin copolymers such as an ethylene-propylene copolymer, an ethylene-1-butene copolymer, an ethylene-3-methyl-1-butene copolymer, an ethylene-4-methyl-1-pentene copolymer, an ethylene-1-hexene copolymer, an ethylene-1-octene copolymer, an ethylene-1-decene copolymer, a propylene-1-butene copolymer, a propylene-1-hexene copolymer, a propylene-1-octene copolymer, a propylene-4-methyl-1-pentene copolymer, an ethylene-propylene-1-butene copolymer, a propylene-1-hexene-ethylene copolymer, and a propylene-1-octene-ethylene copolymer.

A copolymer of ethylene and/or propylene embraces a copolymer with another unsaturated monomer.

Examples of the copolymer with another unsaturated monomer include, but are not limited to, copolymers of ethylene and/or propylene with unsaturated organic acids or derivatives thereof, such as acrylic acid, methacrylic acid, maleic acid, itaconic acid, methyl acrylate, methyl methacrylate, maleic anhydride, aryl maleimide, and alkyl maleimide; copolymers of ethylene and/or propylene with vinyl esters such as vinyl acetate; and copolymers of ethylene and/or propylene with non-conjugated dienes such as dicyclopentadiene, 4-ethylidene-2-norbornene, 4-methyl-1,4-hexadiene, and 5-methyl-1,4-hexadiene.

The olefin-based resin (II) preferably contains at least one polypropylene-based resin from the viewpoint of obtaining economic efficiency and good compatibility in the hydrogenated block copolymer composition of the present embodiment to attain high transparency.

The olefin-based resin (II) may be modified with a prescribed functional group.

The functional group is not especially limited, and examples include an epoxy group, a carboxy group, an acid anhydride group, and a hydroxyl group.

A functional group-containing compound or a denaturant to be used for modifying the olefin-based resin (II) is not especially limited, and examples include the following compounds:

Unsaturated epoxides such as glycidyl methacrylate, glycidyl acrylate, vinyl glycidyl ether, and allyl glycidyl ether; and unsaturated organic acids such as maleic acid, fumaric acid, itaconic acid, citraconic acid, allyl succinic acid, maleic anhydride, fumaric anhydride, and itaconic anhydride.

Other unlimited examples include an ionomer and chlorinated polyolefin.

From the viewpoints of obtaining economic efficiency and good compatibility in the hydrogenated block copolymer composition of the present embodiment to attain high transparency, the olefin-based resin (II) is preferably a polypropylene-based resin such as a polypropylene homopolymer or an ethylene-propylene random or block copolymer.

In particular, from the viewpoint of the transparency and flexibility, the olefin-based resin (II) is more preferably an ethylene-propylene random copolymer.

The olefin-based resin (II) may contain a single material, or may contain two or more materials.

The hydrogenated block copolymer composition of the present embodiment contains the hydrogenated block copolymer (I) and at least one olefin-based resin (II), and the content of the hydrogenated block copolymer (I) is preferably 1% by mass or more and 95% by mass or less, more preferably 1% by mass or more and 90% by mass or less, and further preferably 1% by mass or more and 85% by mass or less.

When the content of the hydrogenated block copolymer (I) is 1% by mass or more, there is a tendency that the wear resistance of the hydrogenated block copolymer composition is improved and the hardness is lowered. On the other hand, when the content of the hydrogenated block copolymer (I) is 95% by mass or less, the wear resistance of the hydrogenated block copolymer composition tends to be improved.

In the hydrogenated block copolymer composition of the present embodiment, an arbitrary rubber softener, modifying agent, additive and the like may be added in addition to the above-described hydrogenated block copolymer (I) and the polyolefin-based resin (II).

The rubber softener softens the hydrogenated block copolymer composition of the present embodiment, and in addition, imparts flowability (moldability) thereto.

The rubber softener may be, but is not limited to, for example, a mineral oil or a liquid or low molecular weight synthetic softener, and in particular, naphthene-based and/or paraffin-based process oils or extender oils are suitably used.

A mineral oil-based rubber softener is a mixture of an aromatic ring, a naphthene ring, and a paraffin ring, and a softener containing a paraffin ring having a carbon number corresponding to 50% or more of all carbons is designated as a paraffin-based softener, a softener containing a naphthene ring having a carbon number corresponding to 30 to 45% is designated as a naphthene-based softener, and a softener containing an aromatic ring having a carbon number over 30% is designated as an aromatic-based softener.

As a synthetic softener, for example, polybutene, low molecular weight polybutadiene, liquid paraffin and the like can be used, but the above-described mineral oil-based rubber softener is more preferred.

When the hydrogenated block copolymer composition of the present embodiment is required of high heat resistance and mechanical properties, a mineral oil-based rubber softener to be used therein has a kinematic viscosity at 40° C. of preferably 60 cst or more, and more preferably 120 cst or more.

One of such rubber softeners may be singly used, or two or more of these may be used together.

The modifying agent has a function to improve scratch resistance on the surface of the hydrogenated block copolymer composition of the present embodiment, or improve adhesiveness.

The modifying agent can be, but is not limited to, for example, organic polysiloxane. Organic polysiloxane exhibits a surface modification effect for the hydrogenated block copolymer composition, and in addition, functions as a wear resistance improving agent.

The modifying agent may be in any of a liquid form having a low viscosity, a liquid form having a high viscosity, and a solid form, and from the viewpoint of attaining good dispersibility in the hydrogenated block copolymer composition of the present embodiment, is suitably in a liquid form, namely, silicone oil is suitably used. The kinematic viscosity is preferably 90 cst or more, and more preferably 1,000 cst or more from the viewpoint of inhibiting bleed of polysiloxane itself. Examples of the polysiloxane include, but are not limited to, general-purpose silicone oils such as dimethyl polysiloxane and methylphenyl polysiloxane, and various modified silicone oils such as alkyl-modified, polyether-modified, fluorine-modified, alcohol-modified, amino-modified, and epoxy-modified silicone oils. Although not especially limited, dimethyl polysiloxane is suitably used because it is highly effective as a wear resistance improving agent. One of such organic polysiloxanes may be singly used, or two or more of these may be used together.

The additive is not especially limited, and can be a filler, a lubricant, a releasing agent, a plasticizer, an antioxidant, a heat stabilizer, a light stabilizer, a UV absorber, a flame retardant, an antistatic agent, a reinforcing agent, and a colorant that are generally used in a thermoplastic resin and a rubbery polymer.

Examples of the filler include, but are not limited to, inorganic fillers such as silica, talc, mica, calcium silicate, hydrotalcite, kaolin, diatomite, graphite, calcium carbonate, magnesium carbonate, magnesium hydroxide, aluminum hydroxide, calcium sulfate, and barium sulfate, and organic fillers such as carbon black.

Examples of the lubricant include, but are not limited to, stearic acid, behenic acid, zinc stearate, calcium stearate, magnesium stearate, and ethylene-bis-stearamide.

Examples of the plasticizer include, but are not limited to, organic polysiloxane and mineral oil.

An example of the antioxidant includes, but is not limited to, a hindered phenol-based antioxidant.

Examples of the heat stabilizer include, but are not limited to, phosphorus-based, sulfur-based and amine-based heat stabilizers.

An example of the light stabilizer includes, but is not limited to, a hindered amine-based light stabilizer.

An example of the UV absorber includes, but is not limited to, a benzotriazole-based UV absorber.

Examples of the reinforcing agent include, but are not limited to, organic fiber, glass fiber, carbon fiber, and metal whisker.

Examples of the colorant include, but are not limited to, titanium oxide, iron oxide, and carbon black.

The other examples include those described in, for example, "Gomu/Plastic Haigo Yakuhin (Rubber/Plastic Compounding Chemicals)" (edited by Rubber Digest Co., Ltd.).

The hydrogenated block copolymer composition of the present embodiment can be produced by a conventionally known method.

Examples of a production method for the hydrogenated block copolymer composition of the present embodiment include, but is not limited to, a method in which respective components (the hydrogenated block copolymer (I), the polyolefin-based resin (II) and other additives) are melt kneaded using a mixer, such as a Bunbury mixer, a single screw extruder, a twin screw extruder, a Ko Kneader, or a multi-screw extruder; and a method in which the respective components are dissolved or dispersed to be mixed, followed by removal of a solvent by heating.

In particular, a melt kneading method using an extruder is suitably employed from the viewpoints of productivity and good kneadability.

The shape of the hydrogenated block copolymer composition of the present invention can be, but is not limited to, an arbitrary shape such as a pellet shape, a sheet shape, a strand shape, or a chip shape. After the melt kneading, a molded article may be directly produced.

[Molded Article using Hydrogenated Block Copolymer Composition]

A molded article of the present embodiment is a molded article made of the hydrogenated block copolymer composition of the present embodiment described above.

The hydrogenated block copolymer composition of the present embodiment can be made into a practically useful molded article through a method not especially limited, such as extrusion molding, injection molding, two-color injection molding, sandwich molding, blow molding, compression molding, vacuum molding, rotational molding, powder slush molding, foam molding, laminate molding, or calendar molding.

The molded article of the present embodiment is not especially limited, and examples include an injection molded article, a blow molded article, a compression molded article, a vacuum molded article, an extrusion molded article, and a foam molded article in various shapes such as a sheet or a film, a molded article in the shape of nonwoven fabric or fiber, and other various molded articles including synthetic leather.

These molded articles can be used for, for example, a vehicle component, a food packaging material, a medical instrument, a member of home appliances, an electronic device member, a building material, an industrial component, a household article, a toy material, a footwear material, a fiber material and the like.

Examples of the vehicle component include, but are not limited to, a side mall, a grommet, a shift knob, a weather strip, a window frame and its sealing material, an arm rest, an assist grip, a door grip, a steering wheel grip, a console box, a head rest, an instrument panel, a bumper, a spoiler, and an air bag cover.

Examples of the medical instrument include, but are not limited to, a medical tube, a medical hose, a catheter, a blood bag, an infusion bag, a platelet storage bag, and a dialysis bag.

Examples of the building material include, but are not limited to, a wall material and a floor material.

The other examples include, but are not limited to, an industrial hose, a hose for food, a hose for a vacuum cleaner, an electrically cooling gasket, various coating materials for an electrical wire and the like, a coating material for a grip, and a soft doll.

The molded article of the present embodiment may be appropriately processed by foaming, powdering, extending, adhering, printing, coating, plating or the like.

The hydrogenated block copolymer composition of the present embodiment exhibits excellent effects in flexibility, low rebound resilience, transparency, and kink resistance, and hence is very useful as a material of a hollow molded article such as a hose or a tube.

(Reinforcing Filler Composition)

A reinforcing filler composition can be prepared by compounding, in the hydrogenated block copolymer or the hydrogenated block copolymer composition of the present embodiment (hereinafter sometimes referred to as the component (A)), at least one reinforcing filler selected from the group consisting of a silica-based inorganic filler, a metal oxide, a metal hydroxide, a metal carbonate, and carbon black (hereinafter sometimes referred to as the component (C)).

A compounding amount of the component (C) in the reinforcing filler composition is, with respect to 100 parts by mass of the hydrogenated block copolymer or the hydrogenated block copolymer composition, preferably 0.5 to 100 parts by mass, more preferably 5 to 100 parts by mass, and further preferably 20 to 80 parts by mass.

When the reinforcing filler composition is prepared by using the hydrogenated block copolymer or the hydrogenated block copolymer composition of the present embodiment (the component (A)), a thermoplastic resin and/or rubbery polymer different from the hydrogenated block copolymer and the olefin-based resin (II) of the present embodiment (hereinafter sometimes referred to as the component (B)) is preferably further contained in an amount of 0 to 500 parts by mass, preferably 5 to 300 parts by mass, and more preferably 10 to 200 parts by mass with respect to 100 parts by mass of the component (A).

Examples of the thermoplastic resin and/or rubbery polymer (the component (B)) include a block copolymer resin of a conjugated diene monomer and a vinyl aromatic monomer having a vinyl aromatic monomer unit content over 60% by mass, or a hydrogenated product thereof (that is different from the hydrogenated block copolymer (A) of the present embodiment, however); a polymer of the vinyl aromatic monomer; a copolymer resin of the vinyl aromatic monomer and another vinyl monomer (for example, ethylene, propylene, butylene, vinyl chloride, vinylidene chloride, vinyl acetate, acrylic acid and acrylic acid ester such as methyl acrylate, methacrylic acid and methacrylic acid ester such as methyl methacrylate, acrylonitrile, or methacrylonitrile); a rubber-modified styrene-based resin (HIPS); an acrylonitrile-butadiene-styrene copolymer resin (ABS); a methacrylic acid ester-butadiene-styrene copolymer resin (MBS); polyethylene; a copolymer having an ethylene content of 50% by mass or more and containing ethylene and another copolymerizable monomer, such as an ethylene-propylene copolymer, an ethylene-butylene copolymer, an ethylene-hexene copolymer, an ethylene-octene copolymer, an ethylene-vinyl acetate copolymer, or a hydrolysate thereof; a polyethylene-based resin such as an ethylene-acrylic acid ionomer or chlorinated polyethylene; polypropylene; a copolymer having a propylene content of 50% by mass or more and containing propylene and another copolymerizable monomer, such as a polypropylene-based resin such as a propylene-ethylene copolymer, a propylene-ethyl acrylate copolymer or chlorinated polypropylene, a cyclic olefin-based resin such as an ethylene-norbornene resin, a polybutene-based resin, a polyvinyl chloride-based resin, a polyvinyl acetate-based resin, or a hydrolysate thereof; a polymer of acrylic acid or an ester thereof and an amide; a polyacrylate-based resin; a polymer of acrylonitrile and/or methacrylonitrile; a nitrile resin that is a copolymer having an acrylonitrile-based monomer content of 50% by mass or more and containing an acrylonitrile-based monomer and another copolymerizable monomer; a polyamide-based resin such as nylon-46, nylon-6, nylon-66, nylon-610, nylon-11, nylon-12, or nylon-12 copolymer; a polyester-based resin; a thermoplastic polyurethane-based resin; a polycarbonate-based polymer such as poly-4,4'-dioxydiphenyl-2,2'-propane carbonate; thermoplastic polysulfone such as polyethersulfone or polyallylsulfone; a polyoxymethylene-based resin; a polyphenylene ether-based resin such as poly(2,6-dimethyl-1,4-phenylene)ether; a polyphenylene sulfide-based resin such as polyphenylene sulfide, or poly4,4'-diphenylene sulfide; a polyarylate-based resin; a polyether ketone polymer or copolymer; a polyketone-based resin; a fluorine-based resin; a polyoxybenzoyl-based polymer; a polyimide-based resin; and a polybutadiene-based resin such as 1,2-polybutadiene and trans-polybutadiene.

Such a component (B) may contain a polar group-containing atomic group, such as a hydroxyl group, an epoxy group, an amino group, a carboxylic acid group or an acid anhydride group, bonded thereto.

The silica-based inorganic filler to be used as the reinforcing filler (the component (C)) is a solid particle containing $SiO_2$ as a principal component of a constituent unit, and examples include silica, clay, talc, kaolin, mica, wollastonite, montmorillonite, zeolite, or an inorganic fibrous substance such as glass fiber. Alternatively, a silica-based inorganic filler having a hydrophobized surface, or a mixture of a silica-based inorganic filler and another non-silica-based inorganic filler can be used. As the silica-based inorganic filler, silica and glass fiber are preferably used. As the silica, dry process white carbon, wet process white carbon, synthetic silicate-based white carbon, what is called colloidal silica, or the like can be used.

The silica-based inorganic filler has an average particle size of preferably 0.01 μm to 150 μm, and in order that the silica-based inorganic filler is dispersed in the reinforcing filler composition to sufficiently exhibit the effect of the addition, an average dispersed particle size is preferably 0.05 μm to 1 μm, and more preferably 0.05 μm to 0.5 μm.

The metal oxide to be used as the reinforcing filler (the component (C)) is a solid particle containing MxOy (wherein M represents a metal atom, and x and y respectively represent an integer of 1 to 6) as a principal component of a constituent unit, and examples include alumina, titanium oxide, magnesium oxide and zinc oxide. Alternatively, a mixture of a metal oxide and an inorganic filler excluding a metal oxide may be used.

The metal hydroxide to be used as the reinforcing filler is a hydrate type inorganic filler such as aluminum hydroxide, magnesium hydroxide, zirconium hydroxide, hydrated aluminum silicate, hydrated magnesium silicate, basic magnesium carbonate, hydrotalcite, calcium hydroxide, barium hydroxide, a hydrate of tin oxide, or a hydrate of an inorganic metal compound such as borax, and among these, magnesium hydroxide and aluminum hydroxide are preferred.

Examples of the metal carbonate to be used as the reinforcing filler include calcium carbonate and magnesium carbonate.

Alternatively, carbon black of FT, SRF, FEF, HAF, ISAF and SAF classes can be used as the reinforcing filler, and carbon black having a nitrogen adsorption specific surface area of 50 mg/g or more and a DBP (dibutyl phthalate) oil adsorption of 80 mL/100 g is preferred.

In the reinforcing filler composition using the hydrogenated block copolymer or the hydrogenated block copolymer composition of the present embodiment, a silane coupling agent (hereinafter sometimes referred to as the component (D)) may be used.

The silane coupling agent is used for obtaining close interaction between the hydrogenated block copolymer and the reinforcing filler, and is a compound containing a group having affinity with or a binding property to one or both of the hydrogenated block copolymer and the reinforcing filler.

A preferably used silane coupling agent has a silanol group or alkoxysilane as well as a polysulfide bond in which two or more mercapto groups and/or sulfur are linked. Specific examples include bis-[3[(triethoxysilyl)-propyl]-tetrasulfide, bis-[3-(triethoxysilyl)-propyl]-disulfide, bis-[2-(triethoxysilyl)-ethyl]-tetrasulfide, 3-mercaptopropyl-trimethoxysilane, 3-triethoxysilylpropyl-N,N-dimethylthiocarbamoyl tetrasulfide, and 3-triethoxysilylpropylbenzothiazole tetrasulfide.

From the viewpoint of obtaining the desired effects, a compounding amount of the silane coupling agent is preferably 0.1% by mass to 30% by mass, more preferably 0.5% by mass to 20% by mass, and further preferably 1% by mass to 15% by mass based on the reinforcing filler composition.

The reinforcing filler composition containing the hydrogenated block copolymer or the hydrogenated block copolymer composition of the present embodiment and the reinforcing filler may be vulcanized with a vulcanizing agent, namely, crosslinked, to obtain a vulcanized composition.

As the vulcanizing agent, a radical generator such as an organic peroxide or an azo compound, an oxime compound, a nitroso compound, a polyamine compound, sulfur, a sulfur compound (such as sulfur monochloride or sulfur dichloride), a disulfide compound, a polymer polysulfur compound or the like can be used.

The amount of the vulcanizing agent to be used is usually 0.01 to 20 parts by mass, and preferably 0.1 to 15 parts by mass with respect to 100 parts by mass of the hydrogenated block copolymer or the hydrogenated block copolymer composition.

From the viewpoint of odor and scorch stability (a property that it is not crosslinked under conditions for mixing respective components but rapidly crosslinked under crosslinking reaction conditions), the organic peroxide (hereinafter sometimes referred to as the component (E)) to be used as the vulcanizing agent is preferably 2,5-dimethyl-2,5-di-(tert-butylperoxy)hexane, 2,5-dimethyl-2,5-di-(tert-butylperoxy)hexyne-3,1,3-bis(tert-butylperoxyisopropyl)benzene, 1,1-bis(tert-butylperoxy)-3,3,5-trimethylcyclohexane, n-butyl-4,4-bis(tert-butylperoxy)valerate, or di-tert-butylperoxide.

In addition to the above, dicumyl peroxide, benzoyl peroxide, p-chlorobenzoyl peroxide, 2,4-dichlorobenzoyl peroxide, tert-butyl peroxybenzoate, tert-butyl perbenzoate, tert-butylperoxy isopropyl carbonate, diacetyl peroxide, lauroyl peroxide, tert-butyl cumyl peroxide or the like can be used.

In vulcanization, a sulfenamide-based, guanidine-based, thiuram-based, aldehyde-amine-based, aldehyde-ammonium-based, thiazole-based, thiourea-based, or dithiocarbamate-based compound may be used as a vulcanization accelerator (hereinafter sometimes referred to as the component (F)) in a necessary amount.

Zinc oxide, stearic acid or the like can be used as a vulcanization aid in a necessary amount.

Furthermore, in crosslinking the reinforcing filler composition by using the organic peroxide described above, sulfur; a peroxy crosslinking aid (hereinafter sometimes referred to as the component (G)) such as p-quinone dioxime, p,p'-dibenzoyl quinone dioxime, N-methyl-N-4-dinitrosoaniline, nitrosobenzene, diphenylguanidine, or trimethylolpropane-N-N'-m-phenylenedimaleimide; a polyfunctional methacrylate monomer such as divinyl benzene, triallyl cyanurate, ethylene glycol dimethacrylate, diethylene glycol dimethacrylate, polyethylene glycol dimethacrylate, trimethylolpropane trimethacrylate, or allyl methacrylate; or a polyfunctional vinyl monomer (hereinafter sometimes referred to as the component (H)) such as vinyl butylate or vinyl stearate can be used, as a vulcanization accelerator in particular, together with the organic peroxide.

Such a vulcanization accelerator is used usually in an amount of preferably 0.01 to 20 parts by mass, and more preferably 0.1 to 15 parts by mass with respect to 100 parts by mass of the hydrogenated block copolymer or the hydrogenated block copolymer composition.

As a method for vulcanizing the reinforcing filler composition with the vulcanizing agent, a conventionally employed method can be applied, and vulcanization is performed at a temperature of, for example, 120° C. to 200° C., and preferably 140° C. to 180° C. The reinforcing filler composition thus vulcanized exhibits heat resistance, bending resistance and oil resistance in a vulcanized state.

In order to improve workability of the reinforcing filler composition, a rubber softener (hereinafter sometimes referred to as the component (I)) may be compounded.

As the rubber softener, a mineral oil, or a liquid or low molecular weight synthetic softener is suitably used. In particular, a naphthene-based and/or paraffin-based process oil or extender oil generally used for softening, bulking, or improving workability of rubber is preferably used.

A mineral oil-based rubber softener is a mixture of an aromatic ring, a naphthene ring, and a paraffin ring, and a softener containing a paraffin ring having a carbon number corresponding to 50% or more of all carbons is designated as a paraffin-based softener, a softener containing a naphthene ring having a carbon number corresponding to 30 to 45% is designated as a naphthene-based softener, and a softener containing an aromatic ring having a carbon number over 30% is designated as an aromatic-based softener. In the reinforcing filler composition, a synthetic softener may be used, and polybutene, low molecular weight polybutadiene, liquid paraffin and the like can be used. The mineral oil-based rubber softer described above is, however, preferably used.

A compounding amount of the rubber softener (the component (I)) in the reinforcing filler composition is, with respect to 100 parts by mass of the hydrogenated block copolymer or the hydrogenated block copolymer composition (the component (A)), preferably 0 to 100 parts by mass, more preferably 1 to 90 parts by mass, and further preferably 30 to 90 parts by mass. When the amount of the rubber softener exceeds 100 parts by mass, bleed-out is easily caused, and it is apprehended that the surface of the composition may become sticky.

The reinforcing filler composition containing the hydrogenated block copolymer or the hydrogenated block copolymer composition of the present embodiment can be suitably used as a building material, a coating material for an electrical wire, a damping material and the like. A vulcanized composition obtained therefrom can be suitably used, owing to the characteristics, for a tire, or a material of an anti-vibration rubber, a belt, an industrial product, footwear, a foam body and the like.

(Crosslinked Product)

The hydrogenated block copolymer or the hydrogenated block copolymer composition of the present embodiment can be crosslinked in the presence of a vulcanizing agent to produce a crosslinked product, namely, a crosslinked hydrogenated block copolymer or a crosslinked hydrogenated block copolymer composition.

When the hydrogenated block copolymer or the hydrogenated block copolymer composition of the present embodiment is crosslinked, heat resistance [high temperature compression set (C-set)] and bending resistance can be improved.

When a crosslinked product of the reinforcing filler composition containing the hydrogenated block copolymer composition of the present embodiment is to be prepared, in particular, a compounding ratio between the hydrogenated block copolymer or the hydrogenated block copolymer composition (the component (A)) and the thermoplastic resin and/or the rubbery polymer (the component (B)) is, in terms of a mass ratio of the component (A)/the component (B), preferably 10/90 to 100/0, more preferably 20/80 to 90/10, further preferably 30/70 to 80/20.

In the present embodiment, a crosslinking method is not especially limited, and what is called "dynamic crosslinking" is preferably performed.

The dynamic crosslinking refers to a method in which various compositions in a melted state are kneaded under a temperature condition where a vulcanizing agent reacts, so as to simultaneously cause dispersion and crosslinking, and is described in detail in a literature of A. Y. Coran et al., (Rub. Chem. and Technol. vol. 53.141-(1980)). The dynamic crosslinking is performed usually by using a closed kneader such as a Bunbury mixer or a pressurized kneader, or a single or twin screw extruder. A kneading temperature is usually 130° C. to 300° C., and preferably 150° C. to 250° C., and a kneading time is usually 1 minute to 30 minutes.

As the vulcanizing agent used in the dynamic crosslinking, an organic peroxide or a phenol resin crosslinking agent is used, and the amount to be used is, with respect to 100 parts by mass of the hydrogenated block copolymer or the hydrogenated block copolymer composition (the component (A)), usually 0.01 to 15 parts by mass, and preferably 0.04 to 10 parts by mass.

As the organic peroxide to be used as the vulcanizing agent, the component (E) described above can be used. When the crosslinking is performed by using the organic peroxide, the component (F) can be used as the vulcanization accelerator, or the component (G), the component (H) and the like can be used together. The amount of these vulcanization accelerators to be used is, with respect to 100 parts by mass of the hydrogenated block copolymer or the hydrogenated block copolymer composition (the component (A)), usually 0.01 to 20 parts by mass, and preferably 0.1 to 15 parts by mass.

In the crosslinked product using the hydrogenated block copolymer or the hydrogenated block copolymer composition (the component (A)) of the present embodiment, additives such as a softener, a heat stabilizer, an antistatic agent, a weathering stabilizer, an anti-aging agent, a filler, a colorant, and a lubricant can be compounded if necessary as long as the purpose of the crosslinked product is not impaired. As a softener to be compounded for adjusting hardness and flowability of a final product, the component (I) described above can be used.

The softener may be added in kneading the respective components, or may be precedently contained in the hydrogenated block copolymer in producing the copolymer, namely, an oil-extended rubber may be precedently prepared.

The amount of the softener to be added is, with respect to 100 parts by mass of the hydrogenated block copolymer or the hydrogenated block copolymer composition (the component (A)), usually 0 to 200 parts by mass, preferably 10 to 150 parts by mass, and more preferably 20 to 100 parts by mass.

As the filler, the component (C) corresponding to the reinforcing filler described above can be used. The amount of the filler to be added is, with respect to 100 parts by mass of the hydrogenated block copolymer or the hydrogenated block copolymer composition (the component (A)), usually 0 to 200 parts by mass, preferably 10 to 150 parts by mass, and more preferably 20 to 100 parts by mass.

It is recommended that the dynamic crosslinking is performed so that a gel content (excluding an insoluble component such as an insoluble matter of an inorganic filler or the like) of the crosslinked product can be preferably 5% by mass to 80% by mass, more preferably 10% by mass to 70% by mass, and further preferably 20% by mass to 60% by mass. The gel content is defined as a ratio (% by mass) of an insoluble matter per g of a sample obtained as follows: 1 g of the crosslinked product is refluxed in a Soxhlet extractor using boiling xylene for 10 hours, the resultant residue is filtered through a 80-mesh wire mesh, and a dry mass (g) of a remaining portion on the mesh of the insoluble matter is measured. The gel content can be controlled by adjusting the type and the amount of the vulcanizing agent, and the vulcanizing conditions (a temperature, a retention time, a share and the like).

The crosslinked product can be applied, similarly to the vulcanized composition of the reinforcing filler composition, to a tire, an anti-vibration rubber, a belt, an industrial product, footwear, a foam body and the like, and further can be used as a material of a medical instrument or a food packaging material.

EXAMPLES

Now, the present embodiment will be described in detail with reference to specific examples and comparative examples, and it is noted that the present embodiment is not limited to these examples and comparative examples.

Various physical properties were measured as follows.

[Method for Specifying Structure of Copolymer, and Method for Measuring Physical Properties]

((1) Content of All Vinyl Aromatic (Styrene) Monomer Units in Hydrogenated Block Copolymer (I))

A block copolymer before hydrogenation was used to measure a content of all vinyl aromatic (styrene) monomer units by using a UV spectrophotometer (UV-2450, manufactured by Shimadzu Corporation).

((2) Content of Polymer Block (Polystyrene Block) principally containing Vinyl Aromatic Monomer Unit in Hydrogenated Block Copolymer (I))

Measurement was performed on a block copolymer before hydrogenation by the NMR method using a nuclear magnetic resonance apparatus (NMR) (a method described in Y. Tanaka, et al., RUBBER CHEMISTRY and TECHNOLOGY 54, 685 (1981); hereinafter referred to as the "NMR" method).

((3-1) Vinyl Bond Content in Hydrogenated Block Copolymer (I))

Measurement was performed on a block copolymer before hydrogenation by using an infrared spectrophotometer (FT/IR-4100, manufactured by JASCO Corporation). A vinyl bond content in the copolymer was calculated by the Hampton method.

((3-2) Vinyl Bond Content in Copolymer Block (b))

Measurement was performed on a block copolymer before hydrogenation sampled immediately before polymerizing the polymer block (c) by using the infrared spectrophotometer (FT/IR-4100, manufactured by JASCO Corporation). A vinyl bond content in the copolymer block (b) was calculated by the Hampton method.

((3-3) Vinyl Bond Content in Polymer Block (c))

This vinyl bond content was calculated based on values of the vinyl bond contents obtained as described in (3-1) and (3-2) above.

((4) Weight Average Molecular Weight of Hydrogenated Block Copolymer (I))

A weight average molecular weight of the hydrogenated block copolymer (I) was measured by GPC [apparatus: HLC-82209PC (manufactured by Tosoh Corporation), column: TSKgel guard column Super HZ-L (4.6 mm×20 cm)×3].

Tetrahydrofuran was used as a solvent. The measurement was performed at a temperature of 35° C.

For the weight average molecular weight, a molecular weight at a peak of a chromatogram was obtained by using a calibration curve obtained through measurement of commercially available standard polystyrene (created by using a peak molecular weight of standard polystyrene).

When there were a plurality of peaks in the chromatogram, an average molecular weight obtained based on molecular weights of the respective peaks and composition ratios corresponding to the respective peaks (obtained from an area ratio among the peaks in the chromatogram) was defined as the weight average molecular weight.

A weight average molecular weight immediately before adding ethyl benzoate was also measured. For the measurement of a hydrogenated block copolymer to which ethyl benzoate was not added, the GPC performed on a polymer sampled immediately before adding ethyl benzoate and deactivated with methanol was used for calculating the weight average molecular weight, and for the measurement of a hydrogenated block copolymer to which ethyl benzoate was added, the GPC was performed on the produced hydrogenated block copolymer (I).

A molecular weight distribution was also measured by the GPC.

((5) Ratios (%) of Area Corresponding to Molecular Weight of 10,000 or More and 150,000 or Less and Area Corresponding to Molecular Weight of 200,000 or More and 1,000,000 or less to Area Corresponding to Molecular Weight of 10,000 to 1,000,000 in GPC Curve of Hydrogenated Block Copolymer (I))

Measurement was performed by GPC [apparatus: HLC-82209PC (manufactured by Tosoh Corporation), column: TSKgel guard column Super HZ-L (4.6 mm×20 cm)×3].

Tetrahydrofuran was used as a solvent.

The measurement was performed at a temperature of 35° C.

An area ratio (%) of a molecular weight of 10,000 or more and 150,000 or less of the hydrogenated block copolymer (I) refers to a value obtained based on a ratio, in a GPC curve of the hydrogenated block copolymer (I), between an area value corresponding to a molecular weight of 10,000 or more and 150,000 or less, and an area value corresponding to a molecular weight of 10,000 or more and 1,000,000 or less.

An area ratio (%) of a molecular weight of 200,000 or more and 100,000 or less of the hydrogenated block copolymer (I) refers to a value obtained based on a ratio, in the GPC curve of the hydrogenated block copolymer (I), between an area value corresponding to a molecular weight of 200,000 or more and 100,000 or less, and the area value corresponding to a molecular weight of 10,000 or more and 1,000,000 or less.

((6) Hydrogeneration Rate of Double Bond of Conjugated Diene Monomer Unit in Hydrogenated Block Copolymer (I))

A hydrogenation rate of a double bond of the conjugated diene monomer unit was measured by using the hydrogenated block copolymer with a nuclear magnetic resonance apparatus (ECS400, manufactured by JEOL RESONANCE Inc.).

((7) Content of Vinyl Aromatic Monomer Unit in Copolymer Block (b))

The content of the vinyl aromatic monomer unit was calculated on the basis of a difference between the content of all vinyl aromatic (styrene) monomer units in the hydrogenated block copolymer (I) and the content of the polymer block principally containing the vinyl aromatic monomer unit in the hydrogenated block copolymer (I) measured with the block copolymer before hydrogenation used as a sample by the NMR method using a nuclear magnetic resonance apparatus (NMR) (a method described in Y. Tanaka, et al., RUBBER CHEMISTRY and TECHNOLOGY 54, 685 (1981); hereinafter referred to as the "NMR" method).

[Method for Measuring Properties]

((1) tan δ Peak Temperature)

First, a "pressed sheet" produced as described later was cut into a size with a width of 12.5 mm and a length of 40 mm to obtain a measurement sample.

Next, the measurement sample was set in an apparatus ARES (trade name, manufactured by TA Instruments) to have a twisted geometry, and measurement was performed under conditions of an effective measurement length of 25 mm, a strain of 0.5%, a frequency of 1 Hz, and a temperature increasing rate of 3° C./min.

The tan δ peak temperature was defined as a value obtained based on a peak detected by automatic measurement with RSI Orchestrator (trade name, manufactured by TA Instruments).

((2) Hardness)

In accordance with JIS K6253, an instantaneous value and a value after 10 seconds were measured using a durometer type A.

A hardness value obtained at a moment when a probe of the durometer touched a sample, and a hardness value obtained 10 seconds after the touch were measured.

In Tables 1 and 2, these hardness values are shown respectively as Hardness (JIS-A, instantaneous) and Hardness (JIS-A, 10 s).

The hardness value is preferably 96 or less.

((3) Melt Flow Rate (MFR, Unit: g/10 min))

Measurement was performed in accordance with JIS K7210 under conditions of a temperature of 230° C. and a load of 2.16 kg.

A sample having an MFR value less than 25 (g/10 min) was scored as 0, a sample having an MFR value of 25 or more and less than 35 (g/10 min) was scored as 1, a sample having an MFR value of 35 or more and less than 45 (g/10 min) was scored as 2, and a sample having an MFR value of 45 (g/10 min) or more was scored as 3, and these scores are shown in the tables.

((4) Wear Resistance)

A color fastness rubbing tester (AB-301, manufactured by Tester Sangyo Co., Ltd.) was used to rub a surface (leather-textured surface) of a molded sheet produced as described in [Production of Injection Molded Sheet] below with a rubbing cloth Kanakin No. 3 under a load of 500 g, and the wear resistance was evaluated in accordance with a volume decrease caused by the rubbing based on the following criteria:

⊚ (Score 3): A volume decrease caused by 10,000 times of rubbing was 0.01 mL or less.

○ (Score 2): A volume decrease caused by 10,000 times of rubbing was over 0.01 mL and 0.1 mL or less.

Δ (Score 1): A volume decrease caused by 10,000 times of rubbing was over 0.1 mL and 0.2 mL or less.

× (Score 0): A volume decrease caused by 10,000 times of rubbing was over 0.2 mL.

((5) Easiness of Pulling Strand (Extrudability))

A hydrogenated block copolymer composition described later was used to visually evaluate, on a scale of 1 to 3, easiness of pulling a strand extruded through a die nozzle of a single screw extruder TEX-30, manufactured by The Japan Steel Works, Ltd.

A strand that could be pulled at a high speed was evaluated as "3", a strand that was easily broken when pulled at a high speed but was not broken when pulled at a low speed was evaluated as "2", and a strand that was easily broken even when pulled at a low speed was evaluated as "1".

Higher score on the scale of 1 to 3 corresponds to more excellent extrudability.

((6) Pellet Blocking Resistance)

Blocking resistance was measured as follows.

In a metal cylinder having a diameter of 5 cm, 60 g of sample pellets of the hydrogenated block copolymer having the same shape (a cylindrical shape having a diameter of about 3 mm×3 mm) was put, and a weight of 1,160 g was put thereon.

In this state, the resultant metal cylinder was heated in a gear oven heated to 42° C. for 20 hours, and then, a state of adhesion among the pellets in the cylinder was observed.

Specifically, a lump of the pellets taken out of the cylinder collapsed (the lump did not collapse, however, when the blocking resistance was poor), and hence, the weight of a lump including three or more pellets was measured, and a ratio (%) of the weight of the lump of the pellets to the total weight (60 g) of the pellets was obtained.

The blocking resistance was evaluated based on the following criteria.

It is noted that the evaluation was performed after adding calcium stearate in an amount corresponding to 1500 ppm to the sample pellets.

3: The lump loosened, and the weight of the lump of three or more pellets was less than 50% of the total mass.

2: The lump loosened, and the weight of the lump of three or more pellets was 50% or more of the total mass.

1: The lump was stiff and did not loosen at all.

[Production of Hydrogenated Block Copolymer]

(Preparation of Hydrogenation Catalyst)

A hydrogenation catalyst to be used in producing a hydrogenated block copolymer in an example and a comparative example described later was prepared as follows.

A reaction vessel equipped with a stirrer having been replaced with nitrogen was charged with 1 liter of dried and purified cyclohexane.

Next, 100 mmol of bis(η5-cyclopentadienyl)titanium dichloride was added thereto.

A n-hexane solution containing 200 mmol of trimethyl aluminum was added to the resultant under sufficient stirring, followed by a reaction at room temperature for about 3 days. Thus, a hydrogenation catalyst was obtained.

<Hydrogenated Block Copolymer>

Hydrogenated block copolymers (I)-1 to (I)-30, (I)-A to (I)-G to be contained in a hydrogenated block copolymer composition were prepared as follows.

Example 1

(Hydrogenated Block Copolymer (I)-1)

A tank reactor (having a capacity of 10 L) equipped with a stirrer and a jacket was used for performing batch polymerization.

First, a cyclohexane solution (concentration of 20% by mass) containing 10 parts by mass of styrene was charged.

Next, n-butyllithium was added in a ratio of 0.096 parts by mass with respect to 100 parts by mass of all monomers, N,N,N',N'-tetramethylethylenediamine (hereinafter referred to as the "TMEDA") was added in a ratio of 1.8 moles per mole of n-butyllithium, sodium-t-pentoxide was added in a ratio of 0.08 moles per mole of n-butyllithium, and the resultant was polymerized at 70° C. for 20 minutes.

Next, a cyclohexane solution (concentration of 20% by mass) containing 37 parts by mass of butadiene and 53 parts by mass of styrene was added thereto, followed by polymerization at 60° C. for 2 hours. Next, ethyl benzoate was added thereto in a ratio of 0.105 moles per mole of n-butyllithium, followed by a reaction at 70° C. for 10 minutes. Thereafter, methanol was added thereto to stop the polymerization reaction.

A block copolymer obtained in this manner had a styrene content of 63% by mass, a polystyrene block content of 10% by mass, a vinyl bond content of 51% by mass, and a weight average molecular weight of 151,000.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass with respect to 100 parts by mass of the block copolymer to obtain a hydrogenated block copolymer (I)-1.

The hydrogenated block copolymer (I)-1 thus obtained had a hydrogenation rate of 98%. The other characteristics thereof are shown in Table 1.

Example 2

(Hydrogenated Block Copolymer (I)-2)

A tank reactor (having a capacity of 10 L) equipped with a stirrer and a jacket was used for performing batch polymerization.

First, a cyclohexane solution (concentration of 20% by mass) containing 20 parts by mass of styrene was charged.

Next, n-butyllithium was added in a ratio of 0.097 parts by mass with respect to 100 parts by mass of all monomers, TMEDA was added in a ratio of 0.9 moles per mole of n-butyllithium, and the resultant was polymerized at 70° C. for 20 minutes.

Next, a cyclohexane solution (concentration of 20% by mass) containing 33 parts by mass of butadiene and 47 parts by mass of styrene was added thereto, followed by polymerization at 60° C. for 2 hours. Next, ethyl benzoate was added thereto in a ratio of 0.048 moles per mole of n-butyllithium, followed by a reaction at 70° C. for 10 minutes. Thereafter, methanol was added thereto to stop the polymerization reaction.

A block copolymer obtained in this manner had a styrene content of 67% by mass, a polystyrene block content of 20% by mass, a vinyl bond content of 21% by mass, and a weight average molecular weight of 131,000.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass with respect to 100 parts by mass of the block copolymer to obtain a hydrogenated block copolymer (I)-2.

The hydrogenated block copolymer (I)-2 thus obtained had a hydrogenation rate of 96%. The other characteristics thereof are shown in Table 1.

Example 3

(Hydrogenated Block Copolymer (I)-3)

A tank reactor (having a capacity of 10 L) equipped with a stirrer and a jacket was used for performing batch polymerization.

First, a cyclohexane solution (concentration of 20% by mass) containing 20 parts by mass of styrene was charged.

Next, n-butyllithium was added in a ratio of 0.097 parts by mass with respect to 100 parts by mass of all monomers, TMEDA was added in a ratio of 0.9 moles per mole of n-butyllithium, and the resultant was polymerized at 70° C. for 20 minutes.

Next, a cyclohexane solution (concentration of 20% by mass) containing 33 parts by mass of butadiene and 47 parts by mass of styrene was added thereto, followed by polymerization at 60° C. for 2 hours. Thereafter, methanol was added thereto to stop the polymerization reaction.

A block copolymer obtained in this manner had a styrene content of 67% by mass, a polystyrene block content of 20% by mass, a vinyl bond content of 21% by mass, and a weight average molecular weight of 120,000.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass with respect to 100 parts by mass of the block copolymer to obtain a hydrogenated block copolymer (I)-3.

The hydrogenated block copolymer (I)-3 thus obtained had a hydrogenation rate of 98%. The other characteristics thereof are shown in Table 1.

Example 4

(Hydrogenated Block Copolymer (I)-4)

A tank reactor (having a capacity of 10 L) equipped with a stirrer and a jacket was used for performing batch polymerization.

First, a cyclohexane solution (concentration of 20% by mass) containing 20 parts by mass of styrene was charged.

Next, n-butyllithium was added in a ratio of 0.095 parts by mass with respect to 100 parts by mass of all monomers, TMEDA was added in a ratio of 1.8 moles per mole of n-butyllithium, sodium-t-pentoxide was added in a ratio of 0.08 moles per mole of n-butyllithium, and the resultant was polymerized at 70° C. for 20 minutes.

Next, a cyclohexane solution (concentration of 20% by mass) containing 33 parts by mass of butadiene and 47 parts by mass of styrene was added thereto, followed by polymerization at 60° C. for 2 hours. Next, ethyl benzoate was added thereto in a ratio of 0.105 moles per mole of n-butyllithium, followed by a reaction at 70° C. for 10 minutes. Thereafter, methanol was added thereto to stop the polymerization reaction.

A block copolymer obtained in this manner had a styrene content of 67% by mass, a polystyrene block content of 20% by mass, a vinyl bond content of 51% by mass, and a weight average molecular weight of 151,000.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass with respect to 100 parts by mass of the block copolymer to obtain a hydrogenated block copolymer (I)-4.

The hydrogenated block copolymer (I)-4 thus obtained had a hydrogenation rate of 97%. The other characteristics thereof are shown in Table 1.

Example 5

(Hydrogenated Block Copolymer (I)-5)

A tank reactor (having a capacity of 10 L) equipped with a stirrer and a jacket was used for performing batch polymerization.

First, a cyclohexane solution (concentration of 20% by mass) containing 4 parts by mass of styrene was charged.

Next, n-butyllithium was added in a ratio of 0.097 parts by mass with respect to 100 parts by mass of all monomers, TMEDA was added in a ratio of 1.8 moles per mole of n-butyllithium, sodium-t-pentoxide was added in a ratio of 0.08 moles per mole of n-butyllithium, and the resultant was polymerized at 70° C. for 20 minutes.

Next, a cyclohexane solution (concentration of 20% by mass) containing 39 parts by mass of butadiene and 57 parts by mass of styrene was added thereto, followed by polymerization at 60° C. for 2 hours. Next, ethyl benzoate was added thereto in a ratio of 0.105 moles per mole of n-butyllithium, followed by a reaction at 70° C. for 10 minutes. Thereafter, methanol was added thereto to stop the polymerization reaction.

A block copolymer obtained in this manner had a styrene content of 61% by mass, a polystyrene block content of 4% by mass, a vinyl bond content of 51% by mass, and a weight average molecular weight of 151,000.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass with respect to 100 parts by mass of the block copolymer to obtain a hydrogenated block copolymer (I)-5.

The hydrogenated block copolymer (I)-5 thus obtained had a hydrogenation rate of 97%. The other characteristics thereof are shown in Table 1.

Example 6

(Hydrogenated Block Copolymer (I)-6)

A tank reactor (having a capacity of 10 L) equipped with a stirrer and a jacket was used for performing batch polymerization.

First, a cyclohexane solution (concentration of 20% by mass) containing 41 parts by mass of butadiene and 59 parts by mass of styrene was charged.

Next, n-butyllithium was added in a ratio of 0.097 parts by mass with respect to 100 parts by mass of all monomers, TMEDA was added in a ratio of 1.8 moles per mole of n-butyllithium, sodium-t-pentoxide was added in a ratio of 0.08 moles per mole of n-butyllithium, and the resultant was polymerized at 60° C. for 2 hours. Next, ethyl benzoate was added thereto in a ratio of 0.105 moles per mole of n-butyllithium, followed by a reaction at 70° C. for 10 minutes. Thereafter, methanol was added thereto to stop the polymerization reaction.

A block copolymer obtained in this manner had a styrene content of 59% by mass, a polystyrene block content of 0% by mass, a vinyl bond content of 51% by mass, and a weight average molecular weight of 151,000.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass with respect to 100 parts by mass of the block copolymer to obtain a hydrogenated block copolymer (I)-6.

The hydrogenated block copolymer (I)-6 thus obtained had a hydrogenation rate of 97%. The other characteristics thereof are shown in Table 1.

Example 7

(Hydrogenated Block Copolymer (I)-7)

A tank reactor (having a capacity of 10 L) equipped with a stirrer and a jacket was used for performing batch polymerization.

First, a cyclohexane solution (concentration of 20% by mass) containing 10 parts by mass of styrene was charged.

Next, n-butyllithium was added in a ratio of 0.097 parts by mass with respect to 100 parts by mass of all monomers, TMEDA was added in a ratio of 1.8 moles per mole of n-butyllithium, sodium-t-pentoxide was added in a ratio of 0.08 moles per mole of n-butyllithium, and the resultant was polymerized at 70° C. for 20 minutes.

Next, a cyclohexane solution (concentration of 20% by mass) containing 36 parts by mass of butadiene and 51 parts by mass of styrene was added thereto, followed by polymerization at 60° C. for 2 hours. Next, a cyclohexane solution (concentration of 20% by mass) containing 3 parts by mass of butadiene was added thereto, followed by polymerization at 60° C. for 10 minutes. Ethyl benzoate was added thereto in a ratio of 0.105 moles per mole of n-butyllithium, followed by a reaction at 70° C. for 10 minutes. Thereafter, methanol was added thereto to stop the polymerization reaction.

A block copolymer obtained in this manner had a styrene content of 61% by mass, a polystyrene block content of 10% by mass, a vinyl bond content of 52% by mass (a vinyl bond content of the copolymer block (b) of 51% by mass, and a vinyl bond content of the polymer block (c) of 70% by mass), and a weight average molecular weight of 151,000.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass with respect to 100 parts by mass of the block copolymer to obtain a hydrogenated block copolymer (I)-7.

The hydrogenated block copolymer (I)-7 thus obtained had a hydrogenation rate of 95%. The other characteristics thereof are shown in Table 1.

Example 8

(Hydrogenated Block Copolymer (I)-8)

A tank reactor (having a capacity of 10 L) equipped with a stirrer and a jacket was used for performing batch polymerization.

First, a cyclohexane solution (concentration of 20% by mass) containing 10 parts by mass of styrene was charged.

Next, n-butyllithium was added in a ratio of 0.099 parts by mass with respect to 100 parts by mass of all monomers, TMEDA was added in a ratio of 1.8 moles per mole of n-butyllithium, sodium-t-pentoxide was added in a ratio of 0.08 moles per mole of n-butyllithium, and the resultant was polymerized at 70° C. for 20 minutes.

Next, a cyclohexane solution (concentration of 20% by mass) containing 33 parts by mass of butadiene and 47 parts by mass of styrene was added thereto, followed by polymerization at 60° C. for 2 hours. Next, a cyclohexane solution (concentration of 20% by mass) containing 10 parts by mass of butadiene was added thereto, followed by polymerization at 60° C. for 20 minutes. Ethyl benzoate was added thereto in a ratio of 0.105 moles per mole of n-butyllithium, followed by a reaction at 70° C. for 10 minutes. Thereafter, methanol was added thereto to stop the polymerization reaction.

A block copolymer obtained in this manner had a styrene content of 57% by mass, a polystyrene block content of 10% by mass, a vinyl bond content of 53% by mass (a vinyl bond content of the copolymer block (b) of 51% by mass, and a vinyl bond content of the polymer block (c) of 70% by mass), and a weight average molecular weight of 151,000.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass with respect to 100 parts by mass of the copolymer to obtain a hydrogenated block copolymer (I)-8.

The hydrogenated block copolymer (I)-8 thus obtained had a hydrogenation rate of 98%. The other characteristics thereof are shown in Table 1.

Example 9

(Hydrogenated Block Copolymer (I)-9)

A tank reactor (having a capacity of 10 L) equipped with a stirrer and a jacket was used for performing batch polymerization.

First, a cyclohexane solution (concentration of 20% by mass) containing 10 parts by mass of styrene was charged.

Next, n-butyllithium was added in a ratio of 0.101 parts by mass with respect to 100 parts by mass of all monomers, TMEDA was added in a ratio of 1.8 moles per mole of n-butyllithium, sodium-t-pentoxide was added in a ratio of 0.08 moles per mole of n-butyllithium, and the resultant was polymerized at 70° C. for 20 minutes.

Next, a cyclohexane solution (concentration of 20% by mass) containing 29 parts by mass of butadiene and 41 parts by mass of styrene was added thereto, followed by polymerization at 60° C. for 2 hours. Next, a cyclohexane solution (concentration of 20% by mass) containing 20 parts by mass of butadiene was added thereto, followed by polymerization at 60° C. for 20 minutes. Ethyl benzoate was added thereto in a ratio of 0.105 moles per mole of n-butyllithium, followed by a reaction at 70° C. for 10 minutes. Thereafter, methanol was added thereto to stop the polymerization reaction.

A block copolymer obtained in this manner had a styrene content of 51% by mass, a polystyrene block content of 10% by mass, a vinyl bond content of 55% by mass (a vinyl bond content of the copolymer block (b) of 51% by mass, and a vinyl bond content of the polymer block (c) of 70% by mass), and a weight average molecular weight of 151,000.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass with respect to 100 parts by mass of the block copolymer to obtain a hydrogenated block copolymer (I)-9.

The hydrogenated block copolymer (I)-9 thus obtained had a hydrogenation rate of 97%. The other characteristics thereof are shown in Table 1.

Example 10

(Hydrogenated Block Copolymer (I)-10)

A tank reactor (having a capacity of 10 L) equipped with a stirrer and a jacket was used for performing batch polymerization.

First, a cyclohexane solution (concentration of 20% by mass) containing 10 parts by mass of styrene was charged.

Next, n-butyllithium was added in a ratio of 0.095 parts by mass with respect to 100 parts by mass of all monomers, TMEDA was added in a ratio of 1.8 moles per mole of n-butyllithium, sodium-t-pentoxide was added in a ratio of 0.08 moles per mole of n-butyllithium, and the resultant was polymerized at 70° C. for 20 minutes.

Next, a cyclohexane solution (concentration of 20% by mass) containing 37 parts by mass of butadiene and 53 parts by mass of styrene was added thereto, followed by polymerization at 60° C. for 2 hours. Next, ethyl benzoate was added thereto in a ratio of 0.105 moles per mole of n-butyllithium, followed by a reaction at 70° C. for 10 minutes. Thereafter, methanol was added thereto to stop the polymerization reaction.

A block copolymer obtained in this manner had a styrene content of 63% by mass, a polystyrene block content of 10% by mass, a vinyl bond content of 51% by mass, and a weight average molecular weight of 126,000.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass with respect to 100 parts by mass of the block copolymer to obtain a hydrogenated block copolymer (I)-10.

The hydrogenated block copolymer (I)-10 thus obtained had a hydrogenation rate of 96%. The other characteristics thereof are shown in Table 1.

Example 11

(Hydrogenated Block Copolymer (I)-11) A tank reactor (having a capacity of 10 L) equipped with a stirrer and a jacket was used for performing batch polymerization.

First, a cyclohexane solution (concentration of 20% by mass) containing 10 parts by mass of styrene was charged.

Next, n-butyllithium was added in a ratio of 0.095 parts by mass with respect to 100 parts by mass of all monomers, TMEDA was added in a ratio of 1.8 moles per mole of n-butyllithium, sodium-t-pentoxide was added in a ratio of 0.08 moles per mole of n-butyllithium, and the resultant was polymerized at 70° C. for 20 minutes.

Next, a cyclohexane solution (concentration of 20% by mass) containing 37 parts by mass of butadiene and 53 parts by mass of styrene was added thereto, followed by polymerization at 60° C. for 2 hours. Next, ethyl benzoate was added thereto in a ratio of 0.225 moles per mole of n-butyllithium, followed by a reaction at 70° C. for 10 minutes. Thereafter, methanol was added thereto to stop the polymerization reaction.

A block copolymer obtained in this manner had a styrene content of 63% by mass, a polystyrene block content of 10% by mass, a vinyl bond content of 51% by mass, and a weight average molecular weight of 152,000.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass with respect to 100 parts by mass of the block copolymer to obtain a hydrogenated block copolymer (I)-11.

The hydrogenated block copolymer (I)-11 thus obtained had a hydrogenation rate of 98%. The other characteristics thereof are shown in Table 2.

Example 12

(Hydrogenated Block Copolymer (I)-12)

A tank reactor (having a capacity of 10 L) equipped with a stirrer and a jacket was used for performing batch polymerization.

First, a cyclohexane solution (concentration of 20% by mass) containing 10 parts by mass of styrene was charged.

Next, n-butyllithium was added in a ratio of 0.108 parts by mass with respect to 100 parts by mass of all monomers, TMEDA was added in a ratio of 1.2 moles per mole of n-butyllithium, sodium-t-pentoxide was added in a ratio of 0.02 moles per mole of n-butyllithium, and the resultant was polymerized at 70° C. for 20 minutes.

Next, a cyclohexane solution (concentration of 20% by mass) containing 37 parts by mass of butadiene and 53 parts by mass of styrene was added thereto, followed by polymerization at 60° C. for 2 hours. Next, ethyl benzoate was added thereto in a ratio of 0.105 moles per mole of n-butyllithium, followed by a reaction at 70° C. for 10 minutes. Thereafter, methanol was added thereto to stop the polymerization reaction.

A block copolymer obtained in this manner had a styrene content of 63% by mass, a polystyrene block content of 10% by mass, a vinyl bond content of 29% by mass, and a weight average molecular weight of 151,000.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass with respect to 100 parts by mass of the block copolymer to obtain a hydrogenated block copolymer (I)-12.

The hydrogenated block copolymer (I)-12 thus obtained had a hydrogenation rate of 95%. The other characteristics thereof are shown in Table 2.

Example 13

(Hydrogenated Block Copolymer (I)-13)

A tank reactor (having a capacity of 10 L) equipped with a stirrer and a jacket was used for performing batch polymerization.

First, a cyclohexane solution (concentration of 20% by mass) containing 10 parts by mass of styrene was charged.

Next, n-butyllithium was added in a ratio of 0.108 parts by mass with respect to 100 parts by mass of all monomers, TMEDA was added in a ratio of 1.5 moles per mole of n-butyllithium, sodium-t-pentoxide was added in a ratio of 0.06 moles per mole of n-butyllithium, and the resultant was polymerized at 70° C. for 20 minutes.

Next, a cyclohexane solution (concentration of 20% by mass) containing 37 parts by mass of butadiene and 53 parts by mass of styrene was added thereto, followed by polymerization at 60° C. for 2 hours. Next, ethyl benzoate was added thereto in a ratio of 0.105 moles per mole of n-butyllithium, followed by a reaction at 70° C. for 10 minutes. Thereafter, methanol was added thereto to stop the polymerization reaction.

A block copolymer obtained in this manner had a styrene content of 63% by mass, a polystyrene block content of 10% by mass, a vinyl bond content of 40% by mass, and a weight average molecular weight of 151,000.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass with respect to 100 parts by mass of the block copolymer to obtain a hydrogenated block copolymer (I)-13.

The hydrogenated block copolymer (I)-13 thus obtained had a hydrogenation rate of 95%. The other characteristics thereof are shown in Table 2.

Example 14

(Hydrogenated Block Copolymer (I)-14)

A tank reactor (having a capacity of 10 L) equipped with a stirrer and a jacket was used for performing batch polymerization.

First, a cyclohexane solution (concentration of 20% by mass) containing 10 parts by mass of styrene was charged.

Next, n-butyllithium was added in a ratio of 0.108 parts by mass with respect to 100 parts by mass of all monomers, TMEDA was added in a ratio of 1.8 moles per mole of n-butyllithium, sodium-t-pentoxide was added in a ratio of 0.08 moles per mole of n-butyllithium, and the resultant was polymerized at 70° C. for 20 minutes.

Next, a cyclohexane solution (concentration of 20% by mass) containing 37 parts by mass of butadiene and 53 parts by mass of styrene was added thereto, followed by polymerization at 60° C. for 2 hours. Next, ethyl benzoate was added thereto in a ratio of 0.105 moles per mole of n-butyllithium, followed by a reaction at 70° C. for 10 minutes. Thereafter, methanol was added thereto to stop the polymerization reaction.

A block copolymer obtained in this manner had a styrene content of 63% by mass, a polystyrene block content of 10% by mass, a vinyl bond content of 51% by mass, and a weight average molecular weight of 151,000.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass with respect to 100 parts by mass of the block copolymer to obtain a hydrogenated block copolymer (I)-14.

The hydrogenated block copolymer (I)-14 thus obtained had a hydrogenation rate of 86%. The other characteristics thereof are shown in Table 2.

Example 15

(Hydrogenated Block Copolymer (I)-15)

A tank reactor (having a capacity of 10 L) equipped with a stirrer and a jacket was used for performing batch polymerization.

First, a cyclohexane solution (concentration of 20% by mass) containing 10 parts by mass of styrene was charged.

Next, n-butyllithium was added in a ratio of 0.108 parts by mass with respect to 100 parts by mass of all monomers, TMEDA was added in a ratio of 1.8 moles per mole of n-butyllithium, sodium-t-pentoxide was added in a ratio of 0.08 moles per mole of n-butyllithium, and the resultant was polymerized at 70° C. for 20 minutes.

Next, a cyclohexane solution (concentration of 20% by mass) containing 37 parts by mass of butadiene and 53 parts by mass of styrene was added thereto, followed by polymerization at 60° C. for 2 hours. Next, ethyl benzoate was added thereto in a ratio of 0.105 moles per mole of n-butyllithium, followed by a reaction at 70° C. for 10 minutes. Thereafter, methanol was added thereto to stop the polymerization reaction.

A block copolymer obtained in this manner had a styrene content of 63% by mass, a polystyrene block content of 10% by mass, a vinyl bond content of 51% by mass, and a weight average molecular weight of 151,000.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass with respect to 100 parts by mass of the block copolymer to obtain a hydrogenated block copolymer (I)-15.

The hydrogenated block copolymer (I)-15 thus obtained had a hydrogenation rate of 90%. The other characteristics thereof are shown in Table 2.

Example 16

(Hydrogenated Block Copolymer (I)-16)

A tank reactor (having a capacity of 10 L) equipped with a stirrer and a jacket was used for performing batch polymerization.

First, a cyclohexane solution (concentration of 20% by mass) containing 10 parts by mass of styrene was charged.

Next, n-butyllithium was added in a ratio of 0.108 parts by mass with respect to 100 parts by mass of all monomers, TMEDA was added in a ratio of 1.8 moles per mole of n-butyllithium, sodium-t-pentoxide was added in a ratio of 0.08 moles per mole of n-butyllithium, and the resultant was polymerized at 70° C. for 20 minutes.

Next, a cyclohexane solution (concentration of 20% by mass) containing 37 parts by mass of butadiene and 53 parts by mass of styrene was added thereto, followed by polymerization at 60° C. for 2 hours. Next, ethyl benzoate was added thereto in a ratio of 0.105 moles per mole of n-butyllithium, followed by a reaction at 70° C. for 10 minutes. Thereafter, methanol was added thereto to stop the polymerization reaction.

A block copolymer obtained in this manner had a styrene content of 63% by mass, a polystyrene block content of 10% by mass, a vinyl bond content of 51% by mass, and a weight average molecular weight of 151,000.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass with respect to 100 parts by mass of the block copolymer to obtain a hydrogenated block copolymer (I)-16.

The hydrogenated block copolymer (I)-16 thus obtained had a hydrogenation rate of 60%. The other characteristics thereof are shown in Table 2.

Example 17

(Hydrogenated Block Copolymer (I)-17)

A tank reactor (having a capacity of 10 L) equipped with a stirrer and a jacket was used for performing batch polymerization.

First, a cyclohexane solution (concentration of 20% by mass) containing 10 parts by mass of styrene was charged.

Next, n-butyllithium was added in a ratio of 0.108 parts by mass with respect to 100 parts by mass of all monomers, TMEDA was added in a ratio of 1.8 moles per mole of n-butyllithium, sodium-t-pentoxide was added in a ratio of 0.08 moles per mole of n-butyllithium, and the resultant was polymerized at 70° C. for 20 minutes.

Next, a cyclohexane solution (concentration of 20% by mass) containing 37 parts by mass of butadiene and 53 parts by mass of styrene was added thereto, followed by polymerization at 60° C. for 2 hours. Next, ethyl benzoate was added thereto in a ratio of 0.105 moles per mole of n-butyllithium, followed by a reaction at 70° C. for 10 minutes. Thereafter, methanol was added thereto to stop the polymerization reaction.

A block copolymer obtained in this manner had a styrene content of 63% by mass, a polystyrene block content of 10% by mass, a vinyl bond content of 51% by mass, and a weight average molecular weight of 151,000.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass with respect to 100 parts by mass of the block copolymer to obtain a hydrogenated block copolymer (I)-17.

The hydrogenated block copolymer (I)-17 thus obtained had a hydrogenation rate of 40%. The other characteristics thereof are shown in Table 2.

Example 18

(Hydrogenated Block Copolymer (I)-18)

A tank reactor (having a capacity of 10 L) equipped with a stirrer and a jacket was used for performing batch polymerization.

First, a cyclohexane solution (concentration of 20% by mass) containing 10 parts by mass of styrene was charged.

Next, n-butyllithium was added in a ratio of 0.102 parts by mass with respect to 100 parts by mass of all monomers, TMEDA was added in a ratio of 1.8 moles per mole of n-butyllithium, sodium-t-pentoxide was added in a ratio of 0.08 moles per mole of n-butyllithium, and the resultant was polymerized at 70° C. for 20 minutes.

Next, a cyclohexane solution (concentration of 20% by mass) containing 52 parts by mass of butadiene and 38 parts by mass of styrene was added thereto, followed by polymerization at 60° C. for 2 hours. Next, ethyl benzoate was added thereto in a ratio of 0.105 moles per mole of n-butyllithium, followed by a reaction at 70° C. for 10 minutes. Thereafter, methanol was added thereto to stop the polymerization reaction.

A block copolymer obtained in this manner had a styrene content of 48% by mass, a polystyrene block content of 10% by mass, a vinyl bond content of 60% by mass, and a weight average molecular weight of 151,000.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass with respect to 100 parts by mass of the block copolymer to obtain a hydrogenated block copolymer (I)-18.

The hydrogenated block copolymer (I)-18 thus obtained had a hydrogenation rate of 97%. The other characteristics thereof are shown in Table 2.

Example 19

(Hydrogenated Block Copolymer (I)-19)

A tank reactor (having a capacity of 10 L) equipped with a stirrer and a jacket was used for performing batch polymerization.

First, a cyclohexane solution (concentration of 20% by mass) containing 10 parts by mass of styrene was charged.

Next, n-butyllithium was added in a ratio of 0.090 parts by mass with respect to 100 parts by mass of all monomers, TMEDA was added in a ratio of 1.8 moles per mole of n-butyllithium, sodium-t-pentoxide was added in a ratio of 0.08 moles per mole of n-butyllithium, and the resultant was polymerized at 70° C. for 20 minutes.

Next, a cyclohexane solution (concentration of 20% by mass) containing 19 parts by mass of butadiene and 71 parts by mass of styrene was added thereto, followed by polymerization at 60° C. for 2 hours. Next, ethyl benzoate was added thereto in a ratio of 0.105 moles per mole of n-butyllithium, followed by a reaction at 70° C. for 10 minutes. Thereafter, methanol was added thereto to stop the polymerization reaction.

A block copolymer obtained in this manner had a styrene content of 81% by mass, a polystyrene block content of 10% by mass, a vinyl bond content of 40% by mass, and a weight average molecular weight of 151,000.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass with respect to 100 parts by mass of the block copolymer to obtain a hydrogenated block copolymer (I)-19.

The hydrogenated block copolymer (I)-19 thus obtained had a hydrogenation rate of 96%. The other characteristics thereof are shown in Table 2.

Example 20

(Hydrogenated Block Copolymer (I)-20)

A tank reactor (having a capacity of 10 L) equipped with a stirrer and a jacket was used for performing batch polymerization.

First, a cyclohexane solution (concentration of 20% by mass) containing 10 parts by mass of styrene was charged.

Next, n-butyllithium was added in a ratio of 0.090 parts by mass with respect to 100 parts by mass of all monomers, TMEDA was added in a ratio of 1.8 moles per mole of n-butyllithium, sodium-t-pentoxide was added in a ratio of 0.08 moles per mole of n-butyllithium, and the resultant was polymerized at 70° C. for 20 minutes.

Next, a cyclohexane solution (concentration of 20% by mass) containing 39.6 parts by mass of butadiene and 50.4 parts by mass of styrene was added thereto, followed by polymerization at 60° C. for 2 hours. Next, ethyl benzoate was added thereto in a ratio of 0.105 moles per mole of n-butyllithium, followed by a reaction at 70° C. for 10 minutes. Thereafter, methanol was added thereto to stop the polymerization reaction.

A block copolymer obtained in this manner had a styrene content of 50% by mass, a polystyrene block content of 10% by mass, a vinyl bond content of 55% by mass, and a weight average molecular weight of 151,000.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass with respect to 100 parts by mass of the block copolymer to obtain a hydrogenated block copolymer (I)-20.

The hydrogenated block copolymer (I)-20 thus obtained had a hydrogenation rate of 96%. The other characteristics thereof are shown in Table 2.

Example 21

(Hydrogenated Block Copolymer (I)-21)

A tank reactor (having a capacity of 10 L) equipped with a stirrer and a jacket was used for performing batch polymerization.

First, a cyclohexane solution (concentration of 20% by mass) containing 10 parts by mass of styrene was charged.

Next, n-butyllithium was added in a ratio of 0.090 parts by mass with respect to 100 parts by mass of all monomers, TMEDA was added in a ratio of 1.8 moles per mole of n-butyllithium, sodium-t-pentoxide was added in a ratio of 0.08 moles per mole of n-butyllithium, and the resultant was polymerized at 70° C. for 20 minutes.

Next, a cyclohexane solution (concentration of 20% by mass) containing 42.3 parts by mass of butadiene and 47.7 parts by mass of styrene was added thereto, followed by polymerization at 60° C. for 2 hours. Next, ethyl benzoate was added thereto in a ratio of 0.105 moles per mole of n-butyllithium, followed by a reaction at 70° C. for 10 minutes. Thereafter, methanol was added thereto to stop the polymerization reaction.

A block copolymer obtained in this manner had a styrene content of 52% by mass, a polystyrene block content of 10% by mass, a vinyl bond content of 51% by mass, and a weight average molecular weight of 151,000.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass with respect to 100 parts by mass of the block copolymer to obtain a hydrogenated block copolymer (I)-21.

The hydrogenated block copolymer (I)-21 thus obtained had a hydrogenation rate of 96%. The other characteristics thereof are shown in Table 3.

Example 22

(Hydrogenated Block Copolymer (I)-22)

A tank reactor (having a capacity of 10 L) equipped with a stirrer and a jacket was used for performing batch polymerization.

First, a cyclohexane solution (concentration of 20% by mass) containing 10 parts by mass of styrene was charged.

Next, n-butyllithium was added in a ratio of 0.090 parts by mass with respect to 100 parts by mass of all monomers, TMEDA was added in a ratio of 1.8 moles per mole of n-butyllithium, sodium-t-pentoxide was added in a ratio of 0.08 moles per mole of n-butyllithium, and the resultant was polymerized at 70° C. for 20 minutes.

Next, a cyclohexane solution (concentration of 20% by mass) containing 37 parts by mass of butadiene and 53 parts by mass of styrene was added thereto, followed by polymerization at 60° C. for 2 hours. Next, ethyl benzoate was added thereto in a ratio of 0.045 moles per mole of n-butyllithium, followed by a reaction at 70° C. for 10 minutes. Thereafter, methanol was added thereto to stop the polymerization reaction.

A block copolymer obtained in this manner had a styrene content of 63% by mass, a polystyrene block content of 10% by mass, a vinyl bond content of 51% by mass, and a weight average molecular weight of 136,000.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass with respect to 100 parts by mass of the block copolymer to obtain a hydrogenated block copolymer (I)-22.

The hydrogenated block copolymer (I)-22 thus obtained had a hydrogenation rate of 96%. The other characteristics thereof are shown in Table 3.

Example 23

(Hydrogenated Block Copolymer (I)-23)

A tank reactor (having a capacity of 10 L) equipped with a stirrer and a jacket was used for performing batch polymerization.

First, a cyclohexane solution (concentration of 20% by mass) containing 10 parts by mass of styrene was charged.

Next, n-butyllithium was added in a ratio of 0.090 parts by mass with respect to 100 parts by mass of all monomers, TMEDA was added in a ratio of 1.8 moles per mole of n-butyllithium, sodium-t-pentoxide was added in a ratio of 0.08 moles per mole of n-butyllithium, and the resultant was polymerized at 70° C. for 20 minutes.

Next, a cyclohexane solution (concentration of 20% by mass) containing 37 parts by mass of butadiene and 53 parts by mass of styrene was added thereto, followed by polymerization at 60° C. for 2 hours. Next, ethyl benzoate was added thereto in a ratio of 0.06 moles per mole of n-butyllithium, followed by a reaction at 70° C. for 10 minutes. Thereafter, methanol was added thereto to stop the polymerization reaction.

A block copolymer obtained in this manner had a styrene content of 63% by mass, a polystyrene block content of 10% by mass, a vinyl bond content of 51% by mass, and a weight average molecular weight of 140,000.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass with respect to 100 parts by mass of the block copolymer to obtain a hydrogenated block copolymer (I)-23.

The hydrogenated block copolymer (I)-23 thus obtained had a hydrogenation rate of 96%. The other characteristics thereof are shown in Table 3.

Example 24

(Hydrogenated Block Copolymer (I)-24)

A tank reactor (having a capacity of 10 L) equipped with a stirrer and a jacket was used for performing batch polymerization.

First, a cyclohexane solution (concentration of 20% by mass) containing 10 parts by mass of styrene was charged.

Next, n-butyllithium was added in a ratio of 0.090 parts by mass with respect to 100 parts by mass of all monomers, TMEDA was added in a ratio of 1.8 moles per mole of n-butyllithium, sodium-t-pentoxide was added in a ratio of 0.08 moles per mole of n-butyllithium, and the resultant was polymerized at 70° C. for 20 minutes.

Next, a cyclohexane solution (concentration of 20% by mass) containing 37 parts by mass of butadiene and 53 parts by mass of styrene was added thereto, followed by polymerization at 60° C. for 2 hours. Next, ethyl benzoate was added thereto in a ratio of 0.105 moles per mole of n-butyllithium, followed by a reaction at 70° C. for 10 minutes. Thereafter, methanol was added thereto to stop the polymerization reaction.

A block copolymer obtained in this manner had a styrene content of 63% by mass, a polystyrene block content of 10% by mass, a vinyl bond content of 33% by mass, and a weight average molecular weight of 151,000.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass with respect to 100 parts by mass of the block copolymer to obtain a hydrogenated block copolymer (I)-24.

The hydrogenated block copolymer (I)-24 thus obtained had a hydrogenation rate of 96%. The other characteristics thereof are shown in Table 3.

Example 25

(Hydrogenated Block Copolymer (I)-25)

A tank reactor (having a capacity of 10 L) equipped with a stirrer and a jacket was used for performing batch polymerization.

First, a cyclohexane solution (concentration of 20% by mass) containing 10 parts by mass of styrene was charged.

Next, n-butyllithium was added in a ratio of 0.102 parts by mass with respect to 100 parts by mass of all monomers, TMEDA was added in a ratio of 1.8 moles per mole of n-butyllithium, sodium-t-pentoxide was added in a ratio of 0.08 moles per mole of n-butyllithium, and the resultant was polymerized at 70° C. for 20 minutes.

Next, a cyclohexane solution (concentration of 20% by mass) containing 29 parts by mass of butadiene and 41 parts by mass of styrene was added thereto, followed by polymerization at 60° C. for 2 hours. Next, ethyl benzoate was added thereto in a ratio of 0.105 moles per mole of n-butyllithium, followed by a reaction at 70° C. for 10 minutes. Thereafter, methanol was added thereto to stop the polymerization reaction.

A block copolymer obtained in this manner had a styrene content of 71% by mass, a polystyrene block content of 30% by mass, a vinyl bond content of 51% by mass, and a weight average molecular weight of 133,000.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass with respect to 100 parts by mass of the block copolymer to obtain a hydrogenated block copolymer (I)-25.

The hydrogenated block copolymer (I)-25 thus obtained had a hydrogenation rate of 96%. The other characteristics thereof are shown in Table 3.

Example 26

(Hydrogenated Block Copolymer (I)-26)

A tank reactor (having a capacity of 10 L) equipped with a stirrer and a jacket was used for performing batch polymerization.

First, a cyclohexane solution (concentration of 20% by mass) containing 10 parts by mass of styrene was charged.

Next, n-butyllithium was added in a ratio of 0.090 parts by mass with respect to 100 parts by mass of all monomers, TMEDA was added in a ratio of 1.8 moles per mole of n-butyllithium, sodium-t-pentoxide was added in a ratio of 0.08 moles per mole of n-butyllithium, and the resultant was polymerized at 70° C. for 20 minutes.

Next, a cyclohexane solution (concentration of 20% by mass) containing 33 parts by mass of butadiene and 57 parts by mass of styrene was added thereto, followed by polymerization at 60° C. for 2 hours. Next, ethyl benzoate was added thereto in a ratio of 0.105 moles per mole of n-butyllithium, followed by a reaction at 70° C. for 10 minutes. Thereafter, methanol was added thereto to stop the polymerization reaction.

A block copolymer obtained in this manner had a styrene content of 67% by mass, a polystyrene block content of 10% by mass, a vinyl bond content of 51% by mass, and a weight average molecular weight of 151,000.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass with respect to 100 parts by mass of the block copolymer to obtain a hydrogenated block copolymer (I)-26.

The hydrogenated block copolymer (I)-26 thus obtained had a hydrogenation rate of 96%. The other characteristics thereof are shown in Table 3.

Example 27

(Hydrogenated Block Copolymer (I)-27)

A tank reactor (having a capacity of 10 L) equipped with a stirrer and a jacket was used for performing batch polymerization.

First, a cyclohexane solution (concentration of 20% by mass) containing 3 parts by mass of styrene was charged.

Next, n-butyllithium was added in a ratio of 0.090 parts by mass with respect to 100 parts by mass of all monomers, TMEDA was added in a ratio of 1.8 moles per mole of n-butyllithium, sodium-t-pentoxide was added in a ratio of 0.08 moles per mole of n-butyllithium, and the resultant was polymerized at 70° C. for 20 minutes.

Next, a cyclohexane solution (concentration of 20% by mass) containing 36 parts by mass of butadiene and 42 parts by mass of styrene was added thereto, followed by polymerization at 60° C. for 2 hours. Next, ethyl benzoate was added thereto in a ratio of 0.105 moles per mole of n-butyllithium, followed by a reaction at 70° C. for 10 minutes. Thereafter, methanol was added thereto to stop the polymerization reaction.

A block copolymer obtained in this manner had a styrene content of 39% by mass, a polystyrene block content of 3% by mass, a vinyl bond content of 51% by mass, and a weight average molecular weight of 151,000.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass with respect to 100 parts by mass of the block copolymer to obtain a hydrogenated block copolymer (I)-27.

The hydrogenated block copolymer (I)-27 thus obtained had a hydrogenation rate of 96%. The other characteristics thereof are shown in Table 3.

Example 28

(Hydrogenated Block Copolymer (I)-28)

A tank reactor (having a capacity of 10 L) equipped with a stirrer and a jacket was used for performing batch polymerization.

First, a cyclohexane solution (concentration of 20% by mass) containing 10 parts by mass of styrene was charged.

Next, n-butyllithium was added in a ratio of 0.112 parts by mass with respect to 100 parts by mass of all monomers, TMEDA was added in a ratio of 1.8 moles per mole of n-butyllithium, sodium-t-pentoxide was added in a ratio of 0.08 moles per mole of n-butyllithium, and the resultant was polymerized at 70° C. for 20 minutes.

Next, a cyclohexane solution (concentration of 20% by mass) containing 32 parts by mass of butadiene and 58 parts by mass of styrene was added thereto, followed by polymerization at 60° C. for 2 hours. Thereafter, methanol was added thereto to stop the polymerization reaction.

A block copolymer obtained in this manner had a styrene content of 42% by mass, a polystyrene block content of 10% by mass, a vinyl bond content of 60% by mass, and a weight average molecular weight of 135,000.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass with respect to 100 parts by mass of the block copolymer to obtain a hydrogenated block copolymer (I)-28.

The hydrogenated block copolymer (I)-28 thus obtained had a hydrogenation rate of 97%. The other characteristics thereof are shown in Table 3.

Example 29

(Hydrogenated Block Copolymer (I)-29)

A tank reactor (having a capacity of 10 L) equipped with a stirrer and a jacket was used for performing batch polymerization.

First, a cyclohexane solution (concentration of 20% by mass) containing 16.7 parts by mass of styrene was charged.

Next, n-butyllithium was added in a ratio of 0.112 parts by mass with respect to 100 parts by mass of all monomers, TMEDA was added in a ratio of 1.8 moles per mole of n-butyllithium, sodium-t-pentoxide was added in a ratio of 0.08 moles per mole of n-butyllithium, and the resultant was polymerized at 70° C. for 20 minutes.

Next, a cyclohexane solution (concentration of 20% by mass) containing 33 parts by mass of butadiene and 50 parts by mass of styrene was added thereto, followed by polymerization at 60° C. for 2 hours. Thereafter, methanol was added thereto to stop the polymerization reaction.

A block copolymer obtained in this manner had a styrene content of 50% by mass, a polystyrene block content of 13.7% by mass, a vinyl bond content of 75% by mass, and a weight average molecular weight of 137,000.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass with respect to 100 parts by mass of the block copolymer to obtain a hydrogenated block copolymer (I)-29.

The hydrogenated block copolymer (I)-29 thus obtained had a hydrogenation rate of 97%. The other characteristics thereof are shown in Table 3.

Example 30

(Hydrogenated Block Copolymer (I)-30)

A tank reactor (having a capacity of 10 L) equipped with a stirrer and a jacket was used for performing batch polymerization.

First, a cyclohexane solution (concentration of 20% by mass) containing 15 parts by mass of styrene was charged.

Next, n-butyllithium was added in a ratio of 0.075 parts by mass with respect to 100 parts by mass of all monomers, TMEDA was added in a ratio of 1.8 moles per mole of n-butyllithium, and the resultant was polymerized at 70° C. for 20 minutes.

Next, a cyclohexane solution (concentration of 20% by mass) containing 35 parts by mass of butadiene and 50 parts by mass of styrene was added thereto, followed by polymerization at 60° C. for 2 hours. Thereafter, methanol was added thereto to stop the polymerization reaction.

A block copolymer obtained in this manner had a styrene content of 65% by mass, a polystyrene block content of 15% by mass, a vinyl bond content of 23% by mass, and a weight average molecular weight of 150,000.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass with respect to 100 parts by mass of the block copolymer to obtain a hydrogenated block copolymer (I)-30.

The hydrogenated block copolymer (I)-30 thus obtained had a hydrogenation rate of 97%. The other characteristics thereof are shown in Table 3.

Comparative Example 1

(Hydrogenated Block Copolymer (I)-A)

A tank reactor (having a capacity of 10 L) equipped with a stirrer and a jacket was used for performing batch polymerization.

First, a cyclohexane solution (concentration of 20% by mass) containing 45 parts by mass of styrene was charged.

Next, n-butyllithium was added in a ratio of 0.092 parts by mass with respect to 100 parts by mass of all monomers, TMEDA was added in a ratio of 1.8 moles per mole of n-butyllithium, sodium-t-pentoxide was added in a ratio of 0.08 moles per mole of n-butyllithium, and the resultant was polymerized at 70° C. for 20 minutes.

Next, a cyclohexane solution (concentration of 20% by mass) containing 23 parts by mass of butadiene and 32 parts by mass of styrene was added thereto, followed by polymerization at 60° C. for 2 hours. Next, ethyl benzoate was added thereto in a ratio of 0.105 moles per mole of n-butyllithium, followed by a reaction at 70° C. for 10 minutes. Thereafter, methanol was added thereto to stop the polymerization reaction.

A block copolymer obtained in this manner had a styrene content of 77% by mass, a polystyrene block content of 10% by mass, a vinyl bond content of 51% by mass, and a weight average molecular weight of 151,000.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass with respect to 100 parts by mass of the block copolymer to obtain a hydrogenated block copolymer (I)-A.

The hydrogenated block copolymer (I)-A thus obtained had a hydrogenation rate of 98%. The other characteristics thereof are shown in Table 4.

Comparative Example 2

(Hydrogenated Block Copolymer (I)-B)

A tank reactor (having a capacity of 10 L) equipped with a stirrer and a jacket was used for performing batch polymerization.

First, a cyclohexane solution (concentration of 20% by mass) containing 10 parts by mass of styrene was charged.

Next, n-butyllithium was added in a ratio of 0.116 parts by mass with respect to 100 parts by mass of all monomers, TMEDA was added in a ratio of 1.8 moles per mole of n-butyllithium, sodium-t-pentoxide was added in a ratio of 0.08 moles per mole of n-butyllithium, and the resultant was polymerized at 70° C. for 20 minutes.

Next, a cyclohexane solution (concentration of 20% by mass) containing 37 parts by mass of butadiene and 53 parts by mass of styrene was added thereto, followed by polymerization at 60° C. for 2 hours. Next, ethyl benzoate was added thereto in a ratio of 0.15 moles per mole of n-butyllithium, followed by a reaction at 70° C. for 10 minutes. Thereafter, methanol was added thereto to stop the polymerization reaction.

A block copolymer obtained in this manner had a styrene content of 63% by mass, a polystyrene block content of 10% by mass, a vinyl bond content of 51% by mass, and a weight average molecular weight of 162,000.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass with respect to 100 parts by mass of the block copolymer to obtain a hydrogenated block copolymer (I)-B.

The hydrogenated block copolymer (I)-B thus obtained had a hydrogenation rate of 96%. The other characteristics thereof are shown in Table 4.

Comparative Example 3

(Hydrogenated Block Copolymer (I)-C)

A tank reactor (having a capacity of 10 L) equipped with a stirrer and a jacket was used for performing batch polymerization.

First, a cyclohexane solution (concentration of 20% by mass) containing 10 parts by mass of styrene was charged.

Next, n-butyllithium was added in a ratio of 0.080 parts by mass with respect to 100 parts by mass of all monomers, TMEDA was added in a ratio of 1.8 moles per mole of n-butyllithium, sodium-t-pentoxide was added in a ratio of 0.08 moles per mole of n-butyllithium, and the resultant was polymerized at 70° C. for 20 minutes.

Next, a cyclohexane solution (concentration of 20% by mass) containing 37 parts by mass of butadiene and 53 parts by mass of styrene was added thereto, followed by polymerization at 60° C. for 2 hours. Next, ethyl benzoate was added thereto in a ratio of 0.25 moles per mole of n-butyllithium, followed by a reaction at 70° C. for 10 minutes. Thereafter, methanol was added thereto to stop the polymerization reaction.

A block copolymer obtained in this manner had a styrene content of 63% by mass, a polystyrene block content of 10% by mass, a vinyl bond content of 51% by mass, and a weight average molecular weight of 210,000.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass with respect to 100 parts by mass of the block copolymer to obtain a hydrogenated block copolymer (I)-C.

The hydrogenated block copolymer (I)-C thus obtained had a hydrogenation rate of 95%. The other characteristics thereof are shown in Table 4.

Comparative Example 4

(Hydrogenated Block Copolymer (I)-D)

A tank reactor (having a capacity of 10 L) equipped with a stirrer and a jacket was used for performing batch polymerization.

First, a cyclohexane solution (concentration of 20% by mass) containing 10 parts by mass of styrene was charged.

Next, n-butyllithium was added in a ratio of 0.096 parts by mass with respect to 100 parts by mass of all monomers, TMEDA was added in a ratio of 0.2 moles per mole of n-butyllithium, and the resultant was polymerized at 70° C. for 20 minutes.

Next, a cyclohexane solution (concentration of 20% by mass) containing 37 parts by mass of butadiene and 53 parts by mass of styrene was added thereto, followed by polymerization at 60° C. for 2 hours. Next, ethyl benzoate was added thereto in a ratio of 0.105 moles per mole of n-butyllithium, followed by a reaction at 70° C. for 10 minutes. Thereafter, methanol was added thereto to stop the polymerization reaction.

A block copolymer obtained in this manner had a styrene content of 63% by mass, a polystyrene block content of 10% by mass, a vinyl bond content of 10% by mass, and a weight average molecular weight of 151,000.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass with respect to 100 parts by mass of the block copolymer to obtain a hydrogenated block copolymer (I)-D.

The hydrogenated block copolymer (I)-D thus obtained had a hydrogenation rate of 98%. The other characteristics thereof are shown in Table 4.

Comparative Example 5

(Hydrogenated Block Copolymer (I)-E)

A tank reactor (having a capacity of 10 L) equipped with a stirrer and a jacket was used for performing batch polymerization.

First, a cyclohexane solution (concentration of 20% by mass) containing 10 parts by mass of styrene was charged.

Next, n-butyllithium was added in a ratio of 0.096 parts by mass with respect to 100 parts by mass of all monomers, TMEDA was added in a ratio of 1.8 moles per mole of n-butyllithium, sodium-t-pentoxide was added in a ratio of 0.08 moles per mole of n-butyllithium, and the resultant was polymerized at 70° C. for 20 minutes.

Next, a cyclohexane solution (concentration of 20% by mass) containing 37 parts by mass of butadiene and 53 parts by mass of styrene was added thereto, followed by polymerization at 60° C. for 2 hours. Next, ethyl benzoate was added thereto in a ratio of 0.105 moles per mole of n-butyllithium, followed by a reaction at 70° C. for 10 minutes. Thereafter, methanol was added thereto to stop the polymerization reaction.

A block copolymer obtained in this manner had a styrene content of 63% by mass, a polystyrene block content of 10% by mass, a vinyl bond content of 51% by mass, and a weight average molecular weight of 151,000.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass with respect to 100 parts by mass of the block copolymer to obtain a hydrogenated block copolymer (I)-E.

The hydrogenated block copolymer (I)-E thus obtained had a hydrogenation rate of 15%. The other characteristics thereof are shown in Table 4.

Comparative Example 6

(Hydrogenated Block Copolymer (I)-F)

A tank reactor (having a capacity of 10 L) equipped with a stirrer and a jacket was used for performing batch polymerization.

First, a cyclohexane solution (concentration of 20% by mass) containing 10 parts by mass of styrene was charged.

Next, n-butyllithium was added in a ratio of 0.096 parts by mass with respect to 100 parts by mass of all monomers, TMEDA was added in a ratio of 1.8 moles per mole of n-butyllithium, sodium-t-pentoxide was added in a ratio of 0.08 moles per mole of n-butyllithium, and the resultant was polymerized at 70° C. for 20 minutes.

Next, a cyclohexane solution (concentration of 20% by mass) containing 72 parts by mass of butadiene and 18 parts by mass of styrene was added thereto, followed by polymerization at 60° C. for 2 hours. Next, ethyl benzoate was added thereto in a ratio of 0.105 moles per mole of n-butyllithium, followed by a reaction at 70° C. for 10 minutes. Thereafter, methanol was added thereto to stop the polymerization reaction.

A block copolymer obtained in this manner had a styrene content of 28% by mass, a polystyrene block content of 10% by mass, a vinyl bond content of 66% by mass, and a weight average molecular weight of 151,000.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass with respect to 100 parts by mass of the block copolymer to obtain a hydrogenated block copolymer (I)-F.

The hydrogenated block copolymer (I)-F thus obtained had a hydrogenation rate of 97%. The other characteristics thereof are shown in Table 4.

Comparative Example 7

(Hydrogenated Block Copolymer (I)-G)

A tank reactor (having a capacity of 10 L) equipped with a stirrer and a jacket was used for performing batch polymerization.

First, a cyclohexane solution (concentration of 20% by mass) containing 10 parts by mass of styrene was charged.

Next, n-butyllithium was added in a ratio of 0.09 parts by mass with respect to 100 parts by mass of all monomers, TMEDA was added in a ratio of 1.8 moles per mole of n-butyllithium, sodium-t-pentoxide was added in a ratio of 0.08 moles per mole of n-butyllithium, and the resultant was polymerized at 70° C. for 20 minutes.

Next, a cyclohexane solution (concentration of 20% by mass) containing 17 parts by mass of butadiene and 73 parts by mass of styrene was added thereto, followed by polymerization at 60° C. for 2 hours. Thereafter, methanol was added thereto to stop the polymerization reaction.

A block copolymer obtained in this manner had a styrene content of 63% by mass, a polystyrene block content of 10% by mass, a vinyl bond content of 51% by mass, and a weight average molecular weight of 151,000.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass with respect to 100 parts by mass of the block copolymer to obtain a hydrogenated block copolymer (I)-G.

The hydrogenated block copolymer (I)-G thus obtained had a hydrogenation rate of 97%. The other characteristics thereof are shown in Table 4.

[Production of Pressed Sheet]

Each of the hydrogenated block copolymers (I)-1 to (I)-30 and (I)-A to (I)-G produced as described above was rolled out by using a 4-inch roll at 160° C., and the resultant was pressed at 200° C. and 100 kg/cm² by using a hydraulic press to produce a pressed sheet having a thickness of 2 mm.

The hydrogenated block copolymers (I)-1 to (I)-30 and (I)-A to (I)-G of Examples 1 to 30 and Comparative Examples 1 to 7 described above were measured for values of the following items:

(Values of Physical Properties)

Content (% by mass) of all vinyl aromatic monomer units

Content (% by mass) of polymer block (a) principally containing vinyl aromatic monomer unit Content (% by mass) of hydrogenated copolymer block (b) containing vinyl aromatic monomer unit and conjugated diene monomer unit Content (% by mass) of hydrogenated polymer block (c) principally containing conjugated diene monomer unit Vinyl bond content (% by mass) of hydrogenated copolymer block (b)

Vinyl bond content (% by mass) of hydrogenated polymer block (c)

Weight average molecular weight (ten thousand) immediately before adding ethyl benzoate Molecular weight distribution (Molecular weight distribution immediately before adding ethyl benzoate if added)

Weight average molecular weight (ten thousand) of hydrogenated block copolymer (I)

Area ratio (%) in GPC chart of area corresponding to molecular weight of 10,000 or more and 150,000 or less to area corresponding to molecular weight of 10,000 or more and 1,000,000 or less Area ratio (%) in GPC chart of area corresponding to molecular weight of 200,000 or more and 1,000,000 or less to area corresponding to molecular weight of 10,000 or more and 1,000,000 or less Vinyl bond content (% by mass) in conjugated diene monomer unit Hydrogenation ratio (%) of double bond in conjugated diene monomer unit Content (% by mass) of vinyl aromatic monomer unit in hydrogenated copolymer block (b)

Content (% by mass) of conjugated diene monomer unit in hydrogenated copolymer block (b)

Melt flow rate (230° C., 2.16 kg)

tan δ (loss tangent) peak temperature in viscoelasticity measurement chart

Hardness A (instantaneous, 10 s)

Pellet blocking property

It is noted that the polymer blocks (a) to (c) respectively refer to the following polymer blocks:

Polymer block (a): polymer block principally containing vinyl aromatic monomer unit Copolymer block (b): hydrogenated copolymer block containing vinyl aromatic monomer unit and conjugate diene monomer unit Polymer block (c): hydrogenated polymer block principally containing conjugated diene monomer unit

[Production of Hydrogenated Block Copolymer Composition]

Hydrogenated block copolymer compositions were produced by respectively using the hydrogenated block copolymers (I)-1 to (I)-30 and (I)-A to (I)-G, and the following olefin-based resin (II).

(Olefin-based Resin (II))

As the olefin-based resin (II), PM900C (PP, manufactured by Sum Allomer, Ltd.; MFR=30) was used.

[Production of Injection Molded Sheet]

Example 31

The hydrogenated block copolymer (I)-1 formed into a pellet shape and the olefin-based resin (II) were compounded in a ratio (% by mass) shown in Table 5, the resultant was kneaded using a twin screw extruder (TEX-30) into a pellet shape, and thus, a hydrogenated block copolymer composition was obtained.

Conditions for extrusion were a cylinder temperature of 230° C., and a screw speed of 300 rpm. The thus obtained composition was injection molded at 210° C. to produce a sheet having a thickness of 2 mm, and thus, a physical property measurement sample was obtained. Results of the physical property measurement are shown in a table below.

Examples 31 to 62 and Comparative Examples 8 to 14

Hydrogenated block copolymer compositions were produced in the same manner as in Example 31 described above except that the respective components were changed as shown in Tables 5 to 8, and their physical properties were measured.

Results of the physical property measurement are shown in Tables 5 to 8.

TABLE 1

| | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Hydrogenated Block Copolymer | (I)-1 | (I)-2 | (I)-3 | (I)-4 | (I)-5 | (I)-6 | (I)-7 | (I)-8 | (I)-9 | (I)-10 |
| Content of All Vinyl Aromatic Compounds (mass %) | 63 | 67 | 67 | 67 | 61 | 59 | 61 | 57 | 51 | 63 |
| Content of Polymer Block (a) (mass %) | 10 | 20 | 20 | 20 | 4 | 0 | 10 | 10 | 10 | 10 |
| Content of Hydrogenated Copolymer Block (b) (mass %) | 90 | 80 | 80 | 80 | 96 | 100 | 87 | 80 | 70 | 90 |
| Content of Hydrogenated Polymer Block (c) (mass %) | 0 | 0 | 0 | 0 | 0 | 0 | 3 | 10 | 20 | 0 |
| Vinyl Bond Content of Hydrogenated Copolymer Block (b) (mass %) | 51 | 21 | 21 | 51 | 51 | 51 | 51 | 51 | 51 | 51 |
| Vinyl Bond Content of Hydrogenated Polymer Block (c) (mass %) | — | — | — | — | — | — | 70 | 70 | 70 | — |
| Weight Average Molecular Weight immediately before adding Ethyl Benzoate (ten thousand) | 12.5 | 12.5 | — | 12.5 | 12.5 | 12.5 | 12.5 | 12.5 | 12.5 | 10.5 |
| Molecular Weight Distribution (Molecular Weight Distribution immediately before adding Ethyl Benzoate if added) | 1.06 | 1.05 | 1.06 | 1.06 | 1.06 | 1.06 | 1.06 | 1.06 | 1.06 | 1.06 |
| Weight Average Molecular Weight (ten thousand) | 15.1 | 13.1 | 12.0 | 15.1 | 15.1 | 15.1 | 15.1 | 15.1 | 15.1 | 12.6 |
| Area Ratio in GPC Chart of Distribution of Molecular Weight of 10000 to 150000 (%) | 79 | 95 | 100 | 79 | 79 | 79 | 79 | 79 | 79 | 80 |
| Area Ratio in GPC Chart of Distribution of Molecular Weight of 200000 to 1000000 (%) | 21 | 5 | 0 | 21 | 21 | 21 | 21 | 21 | 21 | 15 |
| Vinyl Bond Content in Conjugated Diene Monomer Unit (mass %) | 51 | 21 | 21 | 51 | 51 | 51 | 52 | 53 | 55 | 51 |
| Hydrogenation Ratio of Double Bond in Conjugated Diene Monomer Unit (%) | 98 | 96 | 98 | 97 | 97 | 97 | 95 | 98 | 97 | 96 |
| Content of Vinyl Aromatic Compound in Hydrogenated Copolymer Block (b) (mass %) | 59 | 59 | 59 | 59 | 59 | 59 | 59 | 59 | 59 | 59 |
| Content of Vinyl Aromatic Compound of Hydrogenated Copolymer Block (b) in all Polymers (mass %) | 53 | 47 | 47 | 47 | 57 | 59 | 51 | 47 | 41 | 53 |
| Content of Conjugated Diene of Hydrogenated Copolymer Block (b) in all Polymers (mass %) | 37 | 33 | 33 | 33 | 39 | 41 | 36 | 33 | 29 | 37 |
| MFR (230° C., 2.16 kg) | 45 | 25 | 30 | 35 | 60 | 80 | 48 | 50 | 60 | 100 |
| MFR Evaluation | 3 | 1 | 1 | 2 | 3 | 3 | 3 | 3 | 3 | 3 |

TABLE 1-continued

|  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| tan δ Peak Temperature (° C.) | 24 | 20 | 20 | 23 | 23 | 23 | 22 | 20 | 14 | 28 |
| Hardness (JIS-A, instantaneous) | 80 | 65 | 64 | 86 | 71 | 60 | 74 | 71 | 61 | 72 |
| Hardness (JIS-A, 10 s) | 55 | 58 | 57 | 61 | 50 | 47 | 50 | 47 | 53 | 49 |
| Pellet Blocking Property | 3 | 2 | 2 | 3 | 2 | 1 | 3 | 2 | 1 | 2 |

TABLE 2

|  | Ex. 11 | Ex. 12 | Ex. 13 | Ex. 14 | Ex. 15 | Ex. 16 | Ex. 17 | Ex. 18 | Ex. 19 | Ex. 20 |
|---|---|---|---|---|---|---|---|---|---|---|
| Hydrogenated Block Copolymer | (I)-11 | (I)-12 | (I)-13 | (I)-14 | (I)-15 | (I)-16 | (I)-17 | (I)-18 | (I)-19 | (I)-20 |
| Content of All Vinyl Aromatic Compounds (mass %) | 63 | 63 | 63 | 63 | 63 | 63 | 63 | 48 | 81 | 50 |
| Content of Polymer Block (a) (mass %) | 10 | 10 | 10 | 10 | 10 | 10 | 10 | 10 | 10 | 10 |
| Content of Hydrogenated Copolymer Block (b) (mass %) | 90 | 90 | 90 | 90 | 90 | 90 | 90 | 90 | 90 | 90 |
| Content of Hydrogenated Polymer Block (c) (mass %) | 0 | 0 | 0 | 0 | 0 | 0 | 0 | 0 | 0 | 0 |
| Vinyl Bond Content of Hydrogenated Copolymer Block (b) (mass %) | 51 | 29 | 40 | 51 | 51 | 51 | 51 | 60 | 40 | 55 |
| Vinyl Bond Content of Hydrogenated Polymer Block (c) (mass %) | — | — | — | — | — | — | — | — | — | — |
| Weight Average Molecular Weight immediately before adding Ethyl Benzoate (ten thousand) | 10.5 | 12.5 | 12.5 | 12.5 | 12.5 | 12.5 | 12.5 | 12.5 | 12.5 | 12.5 |
| Molecular Weight Distribution (Molecular Weight Distribution immediately before adding Ethyl Benzoate if added) | 1.06 | 1.05 | 1.06 | 1.06 | 1.06 | 1.07 | 1.06 | 1.05 | 1.06 | 1.05 |
| Weight Average Molecular Weight (ten thousand) | 15.2 | 15.1 | 15.1 | 15.1 | 15.1 | 15.1 | 15.1 | 15.1 | 15.1 | 15.1 |
| Area Ratio in GPC Chart of Distribution of Molecular Weight of 10000 to 150000 (%) | 55 | 79 | 79 | 79 | 79 | 79 | 79 | 79 | 79 | 79 |
| Area Ratio in GPC Chart of Distribution of Molecular Weight of 200000 to 1000000 (%) | 35 | 21 | 21 | 21 | 21 | 21 | 21 | 21 | 21 | 21 |
| Vinyl Bond Content in Conjugated Diene Monomer Unit (mass %) | 51 | 29 | 40 | 51 | 51 | 51 | 51 | 60 | 40 | 55 |
| Hydrogenation Ratio of Double Bond in Conjugated Diene Monomer Unit (%) | 98 | 95 | 95 | 86 | 90 | 60 | 40 | 97 | 96 | 96 |
| Content of Vinyl Aromatic Compound in Hydrogenated Copolymer Block (b) (mass %) | 59 | 59 | 59 | 59 | 59 | 59 | 59 | 42 | 79 | 44 |
| Content of Vinyl Aromatic Compound of Hydrogenated Copolymer Block (b) in all Polymers (mass %) | 53 | 53 | 53 | 53 | 53 | 53 | 53 | 38 | 71 | 39.6 |
| Content of Conjugated Diene of Hydrogenated Copolymer Block (b) in all Polymers (mass %) | 37 | 37 | 37 | 37 | 37 | 37 | 37 | 52 | 19 | 50.4 |
| MFR (230° C., 2.16 kg) | 35 | 33 | 42 | 46 | 47 | 55 | 50 | 52 | 35 | 50 |
| MFR Evaluation | 2 | 1 | 2 | 3 | 3 | 3 | 3 | 3 | 2 | 3 |
| tan δ Peak Temperature (° C.) | 20 | 19 | 20 | 20 | 21 | 23 | 23 | 5 | 40 | 10 |
| Hardness (JIS-A, instantaneous) | 78 | 85 | 83 | 78 | 79 | 76 | 74 | 60 | 88 | 75 |
| Hardness (JIS-A, 10 s) | 53 | 60 | 57 | 54 | 54 | 52 | 51 | 50 | 80 | 62 |
| Pellet Blocking Property | 3 | 3 | 3 | 3 | 3 | 3 | 3 | 3 | 3 | 3 |

TABLE 3

|  | Ex. 21 | Ex. 22 | Ex. 23 | Ex. 24 | Ex. 25 | Ex. 26 | Ex. 27 | Ex. 28 | Ex. 29 | Ex. 30 |
|---|---|---|---|---|---|---|---|---|---|---|
| Hydrogenated Block Copolymer | (I)-21 | (I)-22 | (I)-23 | (I)-24 | (I)-25 | (I)-26 | (I)-27 | (I)-28 | (I)-29 | (I)-30 |
| Content of All Vinyl Aromatic Compounds (mass %) | 52 | 63 | 63 | 63 | 71 | 67 | 39 | 42 | 50 | 65 |
| Content of Polymer Block (a) (mass %) | 10 | 10 | 10 | 10 | 30 | 10 | 3 | 10 | 16.7 | 15 |
| Content of Hydrogenated Copolymer Block (b) (mass %) | 90 | 90 | 90 | 90 | 70 | 90 | 78 | 90 | 83.3 | 85 |
| Content of Hydrogenated Polymer Block (c) (mass %) | 0 | 0 | 0 | 0 | 0 | 0 | 20 | 0 | 0 | 0 |
| Vinyl Bond Content of Hydrogenated Copolymer Block (b) (mass %) | 51 | 51 | 51 | 33 | 60 | 60 | 60 | 60 | 75 | 23 |
| Vinyl Bond Content of Hydrogenated Polymer Block (c) (mass %) | — | — | — | — | — | — | — | — | — | — |
| Weight Average Molecular Weight immediately before adding Ethyl Benzoate (ten thousand) | 12.5 | 12.5 | 12.5 | 12.5 | 11 | 12.5 | 12.5 | — | — | — |
| Molecular Weight Distribution (Molecular Weight Distribution immediately before adding Ethyl Benzoate if added) | 1.07 | 1.07 | 1.06 | 1.07 | 1.06 | 1.06 | 1.06 | 1.07 | 1.06 | 1.2 |
| Weight Average Molecular Weight (ten thousand) | 15.1 | 13.6 | 14.0 | 15.1 | 13.3 | 15.1 | 15.1 | 13.5 | 13.7 | 15.0 |
| Area Ratio in GPC Chart of Distribution of Molecular Weight of 10000 to 150000 (%) | 79 | 91 | 88 | 79 | 79 | 79 | 79 | 100 | 100 | 55 |
| Area Ratio in GPC Chart of Distribution of Molecular Weight of 200000 to 1000000 (%) | 21 | 9 | 12 | 21 | 21 | 21 | 21 | 0 | 0 | 0 |
| Vinyl Bond Content in Conjugated Diene Monomer Unit (mass %) | 51 | 51 | 51 | 33 | 51 | 51 | 51 | 60 | 75 | 23 |
| Hydrogenation Ratio of Double Bond in Conjugated Diene Monomer Unit (%) | 96 | 96 | 96 | 96 | 96 | 96 | 96 | 97 | 97 | 97 |
| Content of Vinyl Aromatic Compound in Hydrogenated Copolymer Block (b) (mass %) | 47 | 59 | 59 | 59 | 59 | 63 | 46 | 36 | 40 | 59 |
| Content of Vinyl Aromatic Compound of Hydrogenated Copolymer Block (b) in all Polymers (mass %) | 42.3 | 53 | 53 | 53 | 41 | 57 | 36 | 32 | 33.3 | 50 |
| Content of Conjugated Diene of Hydrogenated Copolymer Block (b) in all Polymers (mass %) | 47.7 | 37 | 37 | 37 | 29 | 33 | 42 | 58 | 50.0 | 35 |

TABLE 3-continued

|  | Ex. 21 | Ex. 22 | Ex. 23 | Ex. 24 | Ex. 25 | Ex. 26 | Ex. 27 | Ex. 28 | Ex. 29 | Ex. 30 |
|---|---|---|---|---|---|---|---|---|---|---|
| MFR (230° C., 2.16 kg) | 43 | 60 | 55 | 35 | 35 | 46 | 46 | 60 | 61 | 33 |
| MFR Evaluation | 2 | 3 | 3 | 2 | 2 | 3 | 3 | 3 | 3 | 1 |
| tan δ Peak Temperature (° C.) | 10 | 22 | 23 | 20 | 25 | 33 | 8 | -5 | 19 | 10 |
| Hardness (JIS-A, instantaneous) | 77 | 79 | 77 | 84 | 75 | 85 | 65 | 54 | 75 | 76 |
| Hardness (JIS-A, 10 s) | 63 | 55 | 54 | 58 | 70 | 79 | 54 | 47 | 63 | 65 |
| Pellet Blocking Property | 3 | 3 | 3 | 3 | 3 | 3 | 3 | 2 | 3 | 3 |

TABLE 4

|  | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|
| Hydrogenated Block Copolymer | (I)-A | (I)-B | (I)-C | (I)-D | (I)-E | (I)-F | (I)-G |
| Content of All Vinyl Aromatic Compounds (mass %) | 77 | 63 | 63 | 63 | 63 | 28 | 83 |
| Content of Polymer Block (a) (mass %) | 45 | 10 | 10 | 10 | 10 | 10 | 10 |
| Content of Hydrogenated Copolymer Block (b) (mass %) | 55 | 90 | 90 | 90 | 90 | 90 | 90 |
| Content of Hydrogenated Polymer Block (c) (mass %) | 0 | 0 | 0 | 0 | 0 | 0 | 0 |
| Vinyl Bond Content of Hydrogenated Copolymer Block (b) (mass %) | 51 | 51 | 51 | 10 | 51 | 66 | 35 |
| Vinyl Bond Content of Hydrogenated Polymer Block (c) (mass %) | — | — | — | — | — | — | — |
| Weight Average Molecular Weight immediately before adding Ethyl Benzoate (ten thousand) | 12.5 | 9.5 | 14 | 12.5 | 12.5 | 12.5 | 12.5 |
| Molecular Weight Distribution (Molecular Weight Distribution immediately before adding Ethyl Benzoate if added) | 1.06 | 1.06 | 1.05 | 1.06 | 1.06 | 1.06 | 1.06 |
| Weight Average Molecular Weight of Copolymer (I) (ten thousand) | 15.1 | 16.2 | 21.0 | 15.1 | 15.1 | 15.1 | 15.1 |
| Area Ratio in GPC Chart of Distribution of Molecular Weight of 10000 to 150000 (%) | 79 | 30 | 50 | 79 | 79 | 79 | 79 |
| Area Ratio in GPC Chart of Distribution of Molecular Weight of 200000 to 1000000 (%) | 21 | 20 | 50 | 21 | 21 | 21 | 21 |
| Vinyl Bond Content in Conjugated Diene Monomer Unit (mass %) | 51 | 51 | 51 | 10 | 51 | 66 | 36 |
| Hydrogenation Ratio of Double Bond in Conjugated Diene Monomer Unit (%) | 98 | 96 | 95 | 98 | 15 | 97 | 97 |
| Content of Vinyl Aromatic Compound in Hydrogenated Copolymer Block (b) (mass %) | 59 | 59 | 59 | 59 | 59 | 20 | 81 |
| Content of Vinyl Aromatic Compound of Hydrogenated Copolymer Block (b) in all Polymers (mass %) | 32 | 53 | 53 | 53 | 53 | 18 | 73 |
| Content of Conjugated Diene of Hydrogenated Copolymer Block (b) in all Polymers (mass %) | 23 | 37 | 37 | 37 | 37 | 72 | 17 |
| MFR (230° C., 2.16 kg) | 5 | 5 | 10 | 15 | 55 | 50 | 30 |
| MFR Evaluation | 0 | 0 | 0 | 0 | 3 | 3 | 1 |
| tan δ Peak Temperature (° C.) | 23 | 23 | 23 | 23 | 23 | -10 | 52 |
| Hardness (JIS-A, instantaneous) | 85 | 81 | 83 | 86 | 75 | 50 | 92 |
| Hardness (JIS-A, 10 s) | 61 | 57 | 61 | 62 | 52 | 45 | 86 |
| Pellet Blocking Property | 3 | 3 | 2 | 3 | 3 | 1 | 3 |

TABLE 5

| | (mass %) | | | | | | | | | | | |
|---|---|---|---|---|---|---|---|---|---|---|---|---|
| | Example 31 | Example 32 | Example 33 | Example 34 | Example 35 | Example 36 | Example 37 | Example 38 | Example 39 | Example 40 | Example 41 | Example 42 |
| Hydrogenated Block Copolymer (I)-1 | 80 | — | — | — | — | — | — | — | — | — | — | — |
| Hydrogenated Block Copolymer (I)-2 | — | 80 | — | — | — | — | — | — | — | — | — | — |
| Hydrogenated Block Copolymer (I)-3 | — | — | 80 | — | — | — | — | — | — | — | — | — |
| Hydrogenated Block Copolymer (I)-4 | — | — | — | 80 | — | — | — | — | — | — | — | — |
| Hydrogenated Block Copolymer (I)-5 | — | — | — | — | 80 | — | — | — | — | — | — | — |
| Hydrogenated Block Copolymer (I)-6 | — | — | — | — | — | 80 | — | — | — | — | — | — |
| Hydrogenated Block Copolymer (I)-7 | — | — | — | — | — | — | 80 | — | — | — | — | — |
| Hydrogenated Block Copolymer (I)-8 | — | — | — | — | — | — | — | 80 | — | — | — | — |
| Hydrogenated Block Copolymer (I)-9 | — | — | — | — | — | — | — | — | 80 | — | — | — |
| Hydrogenated Block Copolymer (I)-10 | — | — | — | — | — | — | — | — | — | 80 | — | — |
| Hydrogenated Block Copolymer (I)-11 | — | — | — | — | — | — | — | — | — | — | 80 | — |

TABLE 5-continued (mass %)

| | Example 31 | Example 32 | Example 33 | Example 34 | Example 35 | Example 36 | Example 37 | Example 38 | Example 39 | Example 40 | Example 41 | Example 42 |
|---|---|---|---|---|---|---|---|---|---|---|---|---|
| Hydrogenated Block Copolymer (I)-12 | — | — | — | — | — | — | — | — | — | — | — | 80 |
| Olefin-based Resin (II) | 20 | 20 | 20 | 20 | 20 | 20 | 20 | 20 | 20 | 20 | 20 | 20 |
| MFR (230° C., 2.16 kg) | 42 | 20 | 24 | 30 | 45 | 55 | 50 | 48 | 65 | 95 | 31 | 24 |
| Wear Resistance | ◎ | ○ | ○ | ◎ | ○ | ○ | ◎ | ○ | ○ | ○ | ◎ | ○ |
| Wear Resistance Evaluation | 3 | 2 | 2 | 3 | 2 | 2 | 3 | 2 | 2 | 2 | 3 | 2 |
| Extrusion Moldability | 3 | 2 | 2 | 3 | 3 | 3 | 3 | 3 | 3 | 3 | 3 | 2 |

TABLE 6

(mass %)

| | Example 43 | Example 44 | Example 45 | Example 46 | Example 47 | Example 48 | Example 49 | Example 50 | Example 51 | Example 52 |
|---|---|---|---|---|---|---|---|---|---|---|
| Hydrogenated Block Copolymer (I)-1 | — | — | — | — | — | — | — | — | — | — |
| Hydrogenated Block Copolymer (I)-13 | 80 | — | — | — | — | — | — | — | — | — |
| Hydrogenated Block Copolymer (I)-14 | — | 80 | — | — | — | — | — | — | — | — |
| Hydrogenated Block Copolymer (I)-15 | — | — | 80 | — | — | — | — | — | — | — |
| Hydrogenated Block Copolymer (I)-16 | — | — | — | 80 | — | — | — | — | — | — |
| Hydrogenated Block Copolymer (I)-17 | — | — | — | — | 80 | — | — | — | — | — |
| Hydrogenated Block Copolymer (I)-18 | — | — | — | — | — | 80 | — | — | — | — |
| Hydrogenated Block Copolymer (I)-19 | — | — | — | — | — | — | 80 | — | — | — |
| Hydrogenated Block Copolymer (I)-20 | — | — | — | — | — | — | — | 80 | — | — |
| Hydrogenated Block Copolymer (I)-21 | — | — | — | — | — | — | — | — | 80 | — |
| Hydrogenated Block Copolymer (I)-22 | — | — | — | — | — | — | — | — | — | 80 |
| Hydrogenated Block Copolymer (I)-23 | — | — | — | — | — | — | — | — | — | — |
| Hydrogenated Block Copolymer (I)-24 | — | — | — | — | — | — | — | — | — | — |
| Hydrogenated Block Copolymer (I)-25 | — | — | — | — | — | — | — | — | — | — |
| Hydrogenated Block Copolymer (I)-26 | — | — | — | — | — | — | — | — | — | — |
| Hydrogenated Block Copolymer (I)-27 | — | — | — | — | — | — | — | — | — | — |
| Hydrogenated Block Copolymer (I)-28 | | | | | | | | | | |
| Hydrogenated Block Copolymer (I)-29 | | | | | | | | | | |
| Hydrogenated Block Copolymer (I)-30 | | | | | | | | | | |
| Olefin-based Resin (II) | 20 | 20 | 20 | 20 | 20 | 20 | 20 | 20 | 20 | 20 |
| MFR (230° C., 2.16 kg) | 33 | 40 | 43 | 45 | 41 | 41 | 31 | 42 | 32 | 46 |
| Wear Resistance | ◎ | ◎ | ◎ | ○ | ○ | Δ | ◎ | Δ | ◎ | Δ |
| Wear Resistance Evaluation | 3 | 3 | 3 | 2 | 2 | 1 | 3 | 1 | 3 | 1 |
| Extrusion Moldability | 3 | 2 | 3 | 2 | 1 | 3 | 2 | 2 | 3 | 3 |

TABLE 7

(mass %)

| | Example 53 | Example 54 | Example 55 | Example 56 | Example 57 | Example 58 | Example 59 | Example 60 | Example 61 | Example 62 |
|---|---|---|---|---|---|---|---|---|---|---|
| Hydrogenated Block Copolymer (I)-1 | — | — | — | — | — | — | — | — | 50 | 20 |
| Hydrogenated Block Copolymer (I)-13 | — | — | — | — | — | — | — | — | — | — |
| Hydrogenated Block Copolymer (I)-14 | — | — | — | — | — | — | — | — | — | — |
| Hydrogenated Block Copolymer (I)-15 | — | — | — | — | — | — | — | — | — | — |
| Hydrogenated Block Copolymer (I)-16 | — | — | — | — | — | — | — | — | — | — |
| Hydrogenated Block Copolymer (I)-17 | — | — | — | — | — | — | — | — | — | — |
| Hydrogenated Block Copolymer (I)-18 | — | — | — | — | — | — | — | — | — | — |
| Hydrogenated Block Copolymer (I)-19 | — | — | — | — | — | — | — | — | — | — |
| Hydrogenated Block Copolymer (I)-20 | — | — | — | — | — | — | — | — | — | — |
| Hydrogenated Block Copolymer (I)-21 | — | — | — | — | — | — | — | — | — | — |
| Hydrogenated Block Copolymer (I)-22 | — | — | — | — | — | — | — | — | — | — |
| Hydrogenated Block Copolymer (I)-23 | 80 | — | — | — | — | — | — | — | — | — |
| Hydrogenated Block Copolymer (I)-24 | — | 80 | — | — | — | — | — | — | — | — |
| Hydrogenated Block Copolymer (I)-25 | — | — | 80 | — | — | — | — | — | — | — |
| Hydrogenated Block Copolymer (I)-26 | — | — | — | 80 | — | — | — | — | — | — |
| Hydrogenated Block Copolymer (I)-27 | — | — | — | — | 80 | — | — | — | — | — |
| Hydrogenated Block Copolymer (I)-28 | | | | | | 80 | — | — | | |
| Hydrogenated Block Copolymer (I)-29 | | | | | | — | 80 | — | | |
| Hydrogenated Block Copolymer (I)-30 | | | | | | — | — | 80 | | |
| Olefin-based Resin (II) | 20 | 20 | 20 | 20 | 20 | 20 | 20 | 20 | 50 | 80 |
| MFR (230° C., 2.16 kg) | 44 | 33 | 34 | 41 | 40 | 45 | 45 | 27 | 40 | 38 |

TABLE 7-continued (mass %)

|  | Example 53 | Example 54 | Example 55 | Example 56 | Example 57 | Example 58 | Example 59 | Example 60 | Example 61 | Example 62 |
|---|---|---|---|---|---|---|---|---|---|---|
| Wear Resistance | ◎ | ◎ | ◎ | ◎ | Δ | Δ | Δ | ○ | ◎ | ◎ |
| Wear Resistance Evaluation | 3 | 3 | 3 | 3 | 1 | 1 | 1 | 2 | 3 | 3 |
| Extrusion Moldability | 3 | 3 | 3 | 3 | 3 | 3 | 3 | 2 | 3 | 3 |

TABLE 8

(mass %)

|  | Comparative Example 8 | Comparative Example 9 | Comparative Example 10 | Comparative Example 11 | Comparative Example 12 | Comparative Example 13 | Comparative Example 14 |
|---|---|---|---|---|---|---|---|
| Hydrogenated Block Copolymer (I)-A | 80 | — | — | — | — | — | — |
| Hydrogenated Block Copolymer (I)-B | — | 80 | — | — | — | — | — |
| Hydrogenated Block Copolymer (I)-C | — | — | 80 | — | — | — | — |
| Hydrogenated Block Copolymer (I)-D | — | — | — | 80 | — | — | — |
| Hydrogenated Block Copolymer (I)-E | — | — | — | — | 80 | — | — |
| Hydrogenated Block Copolymer (I)-F | — | — | — | — | — | 80 | — |
| Hydrogenated Block Copolymer (I)-G | — | — | — | — | — | — | — |
| Hydrogenated Block Copolymer (I)-H | — | — | — | — | — | — | — |
| Hydrogenated Block Copolymer (I)-I | — | — | — | — | — | — | — |
| Hydrogenated Block Copolymer (I)-J | — | — | — | — | — | — | 80 |
| Olefin-based Resin (II) | 20 | 20 | 20 | 20 | 20 | 20 | 20 |
| MFR (230° C., 2.16 kg) | 7 | 13 | 15 | 15 | 40 | 40 | 27 |
| Wear Resistance | ○ | ◎ | ◎ | X | X | X | X |
| Wear Resistance Evaluation | 2 | 3 | 3 | 0 | 0 | 0 | 0 |
| Extrusion Moldability | 3 | 3 | 3 | 1 | 1 | 3 | 1 |

The hydrogenated block copolymers of Examples 1 to 30 and the hydrogenated block copolymer compositions of Examples 31 to 62 are excellent in the balance between the wear resistance and the MFR, and are good in the hardness and the moldability.

INDUSTRIAL AVAILABILITY

A hydrogenated block copolymer and a composition thereof according to the present invention is industrially applicable in the fields of vehicle components (vehicle interior materials and vehicle exterior materials), materials of medical instruments, various containers including food packaging containers, home appliances, industrial components, toys and the like.

The invention claimed is:

1. A hydrogenated block copolymer that is a hydrogenated product of a block copolymer comprising a vinyl aromatic monomer unit and a conjugated diene monomer unit, satisfying the following conditions (1) to (7):
   (1) the hydrogenated block copolymer comprises (b) at least one hydrogenated copolymer block containing a vinyl aromatic monomer unit and a conjugated diene monomer unit;
   (2) the hydrogenated block copolymer comprises (a) a polymer block principally containing a vinyl aromatic monomer unit, and a content of the (a) polymer block containing a vinyl aromatic monomer unit is 40% by mass or less;
   (3) the hydrogenated block copolymer has a weight average molecular weight (Mw) of 200,000 or less;
   (4) the hydrogenated block copolymer has a hydrogenation rate of a double bond of the conjugated diene monomer unit of 20% or more;
   (5) the hydrogenated block copolymer has a ratio, in a molecular weight curve of the hydrogenated block copolymer as measured by gel permeation chromatography (GPC), of an area corresponding to a molecular weight of 10,000 to 150,000 to an area corresponding to a molecular weight of 10,000 to 1,000,000 of over 50%;
   (6) the hydrogenated block copolymer has a vinyl bond content of 20% by mass or more; and
   (7) the hydrogenated block copolymer has a content, in the (b) hydrogenated copolymer block, of the vinyl aromatic monomer unit of 45% by mass or more and 79% by mass or less.

2. The hydrogenated block copolymer according to claim 1, wherein the hydrogenated block copolymer has a vinyl bond content of 30% by mass or more.

3. The hydrogenated block copolymer according to claim 1, wherein
   a ratio, in the molecular weight curve of the hydrogenated block copolymer as measured by gel permeation chromatography (GPC), of an area corresponding to a molecular weight of 200,000 to 1,000,000 to the area corresponding to a molecular weight of 10,000 to 1,000,000 is 10% or more.

4. The hydrogenated block copolymer according to claim 1, wherein a content of all vinyl aromatic monomer units is 40% by mass or more and 80% by mass or less.

5. The hydrogenated block copolymer according to claim 1, wherein
   a content of the polymer block (a) principally containing a vinyl aromatic monomer unit is 1% by mass or more and 20% by mass or less.

6. The hydrogenated block copolymer according to claim 1, comprising 1% by mass or more of a hydrogenated polymer block (c) principally containing a conjugated diene monomer unit.

7. The hydrogenated block copolymer according to claim 1, having, in a viscoelasticity measurement chart, at least one peak of tan δ at 0° C. or more and 30° C. or less.

8. A hydrogenated block copolymer composition, comprising:
   1% by mass or more and 95% by mass or less of the hydrogenated block copolymer (I) according to claim 1; and
   5% by mass or more and 99% by mass or less of at least one olefin-based resin (II).

9. The hydrogenated block copolymer composition according to claim 8, wherein the olefin-based resin (II) contains at least one polypropylene-based resin.

10. A molded article of the hydrogenated copolymer composition according to claim 8.

* * * * *